(12) United States Patent
Shih et al.

(10) Patent No.: US 8,857,248 B2
(45) Date of Patent: Oct. 14, 2014

(54) PIEZOELECTRIC MICROCANTILEVERS AND USES IN ATOMIC FORCE MICROSCOPY

(75) Inventors: Wan Y. Shih, Bryn Mawr, PA (US); Wei-Heng Shih, Bryn Mawr, PA (US); Zuyan Shen, Philadelphia, PA (US); Qing Zhu, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 667 days.

(21) Appl. No.: 13/160,304

(22) Filed: Jun. 14, 2011

(65) Prior Publication Data

US 2011/0265227 A1 Oct. 27, 2011

Related U.S. Application Data

(63) Continuation of application No. 11/946,534, filed on Nov. 28, 2007, now Pat. No. 7,992,431.

(60) Provisional application No. 60/867,539, filed on Nov. 28, 2006, provisional application No. 60/887,703, filed on Feb. 1, 2007.

(51) Int. Cl.
| | | |
|---|---|---|
| *G01B 5/28* | (2006.01) | |
| *G01B 9/04* | (2006.01) | |
| *G01Q 10/04* | (2010.01) | |
| *G01Q 20/04* | (2010.01) | |
| *G01Q 60/38* | (2010.01) | |
| *B82Y 35/00* | (2011.01) | |

(52) U.S. Cl.
CPC *G01Q 60/38* (2013.01); *G01B 9/04* (2013.01); *G01Q 10/045* (2013.01); *G01Q 20/04* (2013.01); *B82Y 35/00* (2013.01)
USPC .......................................... 73/105; 116/275

(58) Field of Classification Search
CPC .......... G01Q 20/02; G01Q 20/04; G01Q 1/00

USPC ............................................ 73/105; 116/275
See application file for complete search history.

(56) References Cited

U.S. PATENT DOCUMENTS

| | | | |
|---|---|---|---|
| 3,205,464 A | 9/1965 | Schwartz | |
| 4,093,883 A | 6/1978 | Yamamoto | |

(Continued)

FOREIGN PATENT DOCUMENTS

| | | |
|---|---|---|
| EP | 0631319 A1 | 12/1994 |
| EP | 1536227 A2 | 6/2005 |

(Continued)

OTHER PUBLICATIONS

Shen Z. et al., "Self-exciting, self-sensing PbZr0.53Ti0.47O3 /SiO2 piezoelectric microcantilevers with femtogram/Hertz sensitivity". Applied Physics Letter 89, Jul. 2006, 023506.

(Continued)

*Primary Examiner* — Hezron E Williams
*Assistant Examiner* — Rodney T Frank
(74) *Attorney, Agent, or Firm* — Mendelsohn, Drucker & Dunleavy, P.C.

(57) ABSTRACT

The invention is direct to a piezoelectric microcantilever for static contact and dynamic noncontact atomic force microscopy which may be carried out in solution. The piezoelectric microcantilever, which includes a piezoelectric layer and a non-piezoelectric layer is capable of self actuation and detection. The piezoelectric layer may be constructed from a lead magnesium niobate-lead titanate $(Pb(Mg_{1/3}Nb_{2/3})O_3)_{0.65}$—$(PbTiO_3)_{0.35}(PMN_{0.65}\text{-}PT_{0.35})$ (PMN-PT), zirconate titanate $(PZT)/SiO_2$ or from any lead-free piezoelectric materials such as doped sodium-potassium niobate-lithium niobate. The piezoelectric layers of the microcantilevers may have dielectric constants of from 1600-3000 and thicknesses below 10 μm. Also disclosed are methods for fabricating microcantilever sensors and methods for atomic force microscopy employing the microcantilevers.

20 Claims, 21 Drawing Sheets

(56) References Cited

U.S. PATENT DOCUMENTS

| | | | |
|---|---|---|---|
| 4,302,694 A | 11/1981 | Fujishima et al. |
| 4,349,762 A | 9/1982 | Kitamura et al. |
| 4,363,993 A | 12/1982 | Nishigaki et al. |
| 4,528,502 A | 7/1985 | Rocha |
| 4,649,312 A | 3/1987 | Robin et al. |
| 4,802,371 A | 2/1989 | Calderara et al. |
| 5,054,323 A | 10/1991 | Hubbard et al. |
| 5,313,535 A | 5/1994 | Williams |
| 5,334,835 A | 8/1994 | Nakayama et al. |
| 5,338,999 A | 8/1994 | Ramakrishnan et al. |
| 5,382,864 A | 1/1995 | Morikawa et al. |
| 5,445,008 A | 8/1995 | Wachter et al. |
| 5,475,318 A | 12/1995 | Marcus et al. |
| 5,503,010 A | 4/1996 | Yamanaka |
| 5,553,486 A | 9/1996 | Bonin |
| 5,626,728 A | 5/1997 | Ramakrishnan et al. |
| 5,689,063 A | 11/1997 | Fujiu et al. |
| 5,719,324 A | 2/1998 | Thundat et al. |
| 5,780,727 A | 7/1998 | Gimzewski et al. |
| 5,807,758 A | 9/1998 | Lee et al. |
| 5,866,807 A | 2/1999 | Elings et al. |
| 5,874,126 A | 2/1999 | Kahn et al. |
| 5,948,993 A | 9/1999 | Ting et al. |
| 5,966,787 A | 10/1999 | Nakayama et al. |
| 5,996,412 A | 12/1999 | Hansen |
| 6,075,585 A | 6/2000 | Minne et al. |
| 6,278,379 B1 | 8/2001 | Allen et al. |
| 6,280,396 B1 | 8/2001 | Clark |
| 6,289,717 B1 | 9/2001 | Thundat et al. |
| 6,336,366 B1 | 1/2002 | Thundat et al. |
| 6,422,069 B1 | 7/2002 | Shimizu et al. |
| 6,458,327 B1 | 10/2002 | Vossmeyer et al. |
| 6,465,368 B2 | 10/2002 | Inoue et al. |
| 6,589,727 B1 | 7/2003 | Klenerman et al. |
| 6,621,080 B2 | 9/2003 | Yamamoto |
| 6,734,425 B2 | 5/2004 | Hantschel et al. |
| 6,781,285 B1 | 8/2004 | Lazarus et al. |
| 6,903,491 B2 | 6/2005 | Irie et al. |
| 6,992,421 B2 | 1/2006 | Ikeda et al. |
| 7,055,378 B2 | 6/2006 | Su et al. |
| 7,083,270 B2 | 8/2006 | Torii et al. |
| 7,084,554 B2 | 8/2006 | Xu et al. |
| 7,104,134 B2 | 9/2006 | Amano et al. |
| 7,195,909 B2 | 3/2007 | Klenerman et al. |
| 7,263,874 B2 | 9/2007 | Fitch et al. |
| 7,458,265 B2 | 12/2008 | Shih et al. |
| 7,497,133 B2 | 3/2009 | Shih et al. |
| 7,744,773 B2 | 6/2010 | Shih et al. |
| 7,942,056 B2 | 5/2011 | Mutharasan et al. |
| 7,992,431 B2 | 8/2011 | Shih et al. |
| 2002/0094528 A1 | 7/2002 | Salafsky |
| 2002/0117659 A1 | 8/2002 | Lieber et al. |
| 2002/0155303 A1 | 10/2002 | Wielstra et al. |
| 2003/0032293 A1 | 2/2003 | Kim et al. |
| 2003/0068655 A1 | 4/2003 | Bottomley et al. |
| 2003/0194697 A1 | 10/2003 | Klenerman et al. |
| 2003/0224551 A1 | 12/2003 | Kim et al. |
| 2003/0235681 A1 | 12/2003 | Sebastian et al. |
| 2004/0022677 A1 | 2/2004 | Wohlstadter et al. |
| 2004/0265664 A1 | 12/2004 | Badding et al. |
| 2005/0112621 A1 | 5/2005 | Kim et al. |
| 2005/0114045 A1 | 5/2005 | Giurgiutiu et al. |
| 2005/0199047 A1 | 9/2005 | Adams et al. |
| 2005/0277852 A1 | 12/2005 | Shih et al. |
| 2005/0287680 A1 | 12/2005 | Venkatasubbarao et al. |
| 2006/0053870 A1 | 3/2006 | Berndt |
| 2006/0217893 A1 | 9/2006 | Li et al. |
| 2006/0223691 A1 | 10/2006 | Shih et al. |
| 2006/0228657 A1 | 10/2006 | Masters et al. |
| 2006/0257286 A1 | 11/2006 | Adams |
| 2007/0089515 A1 | 4/2007 | Shih et al. |
| 2007/0141721 A1 | 6/2007 | Vafai et al. |
| 2007/0169553 A1 | 7/2007 | Mutharasan |
| 2007/0218534 A1 | 9/2007 | Klenerman et al. |
| 2008/0034840 A1 | 2/2008 | Mutharasan |
| 2008/0035180 A1 | 2/2008 | Mutharasan |
| 2009/0007645 A1 | 1/2009 | Shih et al. |
| 2009/0053709 A1 | 2/2009 | Mutharasan |
| 2009/0078023 A1 | 3/2009 | Mutharasan |
| 2009/0203000 A1 | 8/2009 | Mutharasan |
| 2010/0068697 A1 | 3/2010 | Shih et al. |
| 2010/0239463 A1 | 9/2010 | Shih et al. |

FOREIGN PATENT DOCUMENTS

| | | |
|---|---|---|
| WO | 98/50773 A2 | 11/1998 |
| WO | 2004/061991 A1 | 7/2004 |
| WO | 2005/043126 A2 | 5/2005 |
| WO | 2006/031072 A1 | 3/2006 |
| WO | 2007/087328 A2 | 8/2007 |
| WO | 2007/133619 A1 | 11/2007 |
| WO | 2008/020903 A2 | 2/2008 |
| WO | 2008/021187 A2 | 2/2008 |
| WO | 2008/021189 A2 | 2/2008 |
| WO | 2008/101199 A1 | 8/2008 |
| WO | 2009/014830 A1 | 1/2009 |
| WO | 2009/035732 A2 | 3/2009 |
| WO | 2009/035732 A3 | 3/2009 |

OTHER PUBLICATIONS

Lee, C. et al., "Self-excited piezoelectric PZT microcantilevers for dynamic SFM—with inherent sensing and actuating capabilities". Sensors and Actuators A72, 1999, pp. 179-188.

Kim, S. et al., "Fabrication and Characterization of Pb(Zr,Ti)O3 Microcantilever for Resonance Sensors". Jpn. J. Appl. Phys. vol. 42, Mar. 2003, pp. 1475-1478.

Wellman, P. S. et al., "Tactile Imaging: A Method for Documenting Breast Lumps", in Jul. 2010.

Weng, L. et al., "Effect of acetylacetone on the preparation of PZT materials in sol/gel processing", Mater. Sci. Engin., 896: 307-312 (2002).

Wilson, L S et al., "Elastography—the movement begins", Phys. Med. Biol., 45: 1409-1421 (2000).

Wilson, L., et al., "Pezoelectric-excited millimeter-sized cantilever (PEMC) sensor provides viscosity and density measurements," Submitted to Review of Scientific Instruments, 1-26.

Yi, J. W. et al., "Effect of length, width, and mode on the mass detection sensitivity of piezoelectric unimorph cantilevers", J. Appl. Phys., 91(3): 1680-1686 (2002).

Yi, J. W. et al., "In situ cell detection using piezoelectric lead zirconate titanate-stainless steel cantilevers", J. Appl. Phys., 93(1): 619-625 (2003).

Zhao, Q. et al., "Array adsorbent-coated lead zirconate titanate (PZT)/stainless steel cantilevers for dimethyl methylphosphonate (DMMP) detection", Sensors and Actuators, B117(1): 74-79 (2006). Abstract Only.

Zhou, J. et al., "Zeolite-modified microcantilever gas sensor for indoor air quality control," Sensors and Actuators B, Oct. 1, 2003, 94(3), 337-342.

Zhu, D.M. et al., "Thermal conductivity and electromechanical property of single-crystal lead magnesium niobate titanate", Appl. Phys. Lett., 75(24): 3868-3870 (1999).

Data of Commercially Available Product, EDO Corporation: 1-8 (1999).

Data of Commercially Available Product, APC International, Ltd.: 1-2 (2005).

Campbell, G.A., et al., "Use of Piezoelectric-Excited millimeter Sized Cantilever Sensors to Measure Albumin Interaction with Self-Assembled Monolayers of Alkanethiols Having Different Functional Headgroups," Anal. Chem. 78, 2328-2334 (2006).

Campbell, G.A et al., "Method of measuring *Bacillus anthracis* spores in the Presence of copious amounts of *Bacillus thurigiensis* and *Bacillus cereus*," Anal. Chem. 79, 1145-1152 (2007).

Campbell, G.A., et al., "PEMC sensor's mass change sensitivity is 20 pg/Hz under liquid immersion," Biosensors and Bioelectronics, 22, 35-41 (2006).

Campbell, G.A., et al., "Detection of *Bacillus anthracis* spores and a model protein usings PEMC sensors in a flow cell at 1 mL/min," Biosensors and Bioelectronics, 22, 78-85 (2006).

(56) References Cited

OTHER PUBLICATIONS

Campbell, G.A., et al., "Detection of airborne *Bacillus anthracis* spores by an integrated system of an air sampler and a cantilever immunosensor," Sensors and Actuators B 127, 376-382 (2007).

Maraldo, et al., "Method for Label-Free Detection of Femtogram Quantities of Biologics in Flowing Liquid Samples," Anal. Chem. 79, 2762-2770 (2007).

Maraldo, et al., "Detection and confirmation of staphylococcal enterotoxin B in apple juice and milk using piezoelectric-excited millimeter-sized cantilever sensors at 2.5 fg/mL," Anal Chem. 79, 7636-7643 (2007).

Maraldo, et al., "Method for Quantification of a Prostate Cancer Biomarker in Urine without Sample Preparation," Anal. Chem. 79, 7683-7690 (2007).

Maraldo, et al., "10-Minute assay for detecting *Escherichia coli* O157:H7 in ground beef samples using piezoelectric-excited millimeter-size cantilever sensors." Journal of Food Protection, vol. 70, No. 7, 1670-1677 (2007).

Maraldo, et al., "Preapration-Free Method for Detecting *Escherichia coli* O157:H7 in the Presence of Spinach, Spring Lettuce Mix, and Ground Beef Particulates," Journal of Food Protection, vol. 70, No. 11, 2651-2655 (2007).

Rijal, et al., "PEMC-based method of measuring DNA hybridization at femtomolar concentration directly in human serum and in the presence of copious noncomplementary strands," Anal. Chem., 79, 7392-7400 (2007).

Rijal, et al., "Method for measuring the Self-Assembly of Alkanethiols on Gold at Femtomolar Concentrations," Langmuir, 23, 6856-6863 (2007).

Wilson, et al., "Viscosity and density values from excitation level response of piezoelectric-excited cantilever sensors," Sensors and Actuators A 138, 44-51 (2007).

Gu, et al., "Single-Calcination Synthesis of Pyrochlore-Free 0.9Pb (Mg1/3Nb2/3)O3-0.1PbTiO3 and Pb(Mg1/3Nb2/3)O3 Ceramics using a Coating Method," J. Am. Ceram. Soc., 86 [2] 217-21 (2003).

Thaysen, et al., "Cantilever-Based Bio-Chemical Sensor Integrated in a Microliquid Handling System," 401-404 (2001).

Li, et al., Micromachined Biomimetic Sensor Using a Modular Artificial Hair Cells, pp. 1-3, in Jan. 2000.

Thaysen, "Label free Detection, BioMEMs Materials and Fabrication Methods," Track 2, 3:00pm, pp. 1-3, Sep. 7, 2002.

Amanuma, K et al., "Crystallization behavior of sol-gel derived Pb(Zr,Ti)O3 thin films and the polarization switching effect on film microstructure", Appl. Phys. Left., 65(24): 3140-3142 (1994).

Ammari, H et al., "T-Scan Electrical Impedance Imaging System for Anomaly Detection", Siam J. Appl. Math., 65(1): 252-266 (2004).

Baselt, D. R. et al., "Biosensor based on force microscope technology", J. Vac. Sol. Technol. B, 14(2): 789-793 (1996).

Birnie, III, D. P. et al., "Coating uniformity and device applicability of spin coated sol-gel PXT films", Microelectronic Engineering, 29: 189-192 (1995).

Bondoux, C. et al., "MgO insulating films prepared by sol-gel route for SiC substrate", J. Europe. Ceramic Soc., 25: 2795-2798 (2005).

Brito, R. et al., "Adsorption of 3-mercaptopropyltrimethoxysilane and 3-aminopropyltrihexoxysilane at platinum electrodes", J. Electroanalytical Chem., 520: 47-52 (2002).

Campbell, G.A., et al., "Piezoelectric excited millimeter-sized cantilever (PEMC) sensor detects *Escherichia coli* O157:H7 in two-hour incubated samples at 4 CFU per gram of beef," J. of Rapid Methods and Automation in Mirobiology, 1-39, in Jul. 2006.

Campbell, G.A., et al., "Detection and quantification of proteins using self-excited PZT-glass millimeter-sized cantilever," Biosensors and Bioelectronics, 26-36, in Jan. 2005.

Campbell, G.A., "Piezoelectric-excited millimeter-sized cantilever (PEMC) sensors detect *Bacillus anthracis* at 300 spores/mL," Biosensors and Bioelectronics, 37-45, in Sep. 2005.

Campbell, G.A., et al., "Kinetics of *Bacillus anthracis* spore binding to antibody functionalized PEMC sensors in presence of *Bacillus thuringiensis* and *Bacillus cereus*," J. Publications, Am. Chem. Soc. 25 pages, in Feb. 2006.
Campbell, G.A., et al., "*Escherichia coli* O157:H7 detection limit of millimeter-sized PZT cantilever sensors in 700 cells/mL," Analytical Sci., 11-13, in Apr. 2005.
Campbell, G.A., et al., "Detection of pathogen *Escherichia coli*O157:H7 using self-excited PZT-glass microcantilevers," Biosensors and Boelectronics, 14-25, in Dec. 2004.
Campbell, G,A., "Detection of *Staphylococcus* enterotoxin B at pictogram levels using piezoelectric-excited millimeter-sized cantilever sensors," Submitted on line to J. of Analytical Chem., 1-24, in Mar. 2006.
Campbell, G.A., et al., "Detect *Escherichia coli* O157:H7 in ground beef samples using Piezoelectric excited millimeter-sized cantilever (PEMC) sensors," Submitted on-line to Biosensors and Bioelectronics, 2-34, in Jul. 2006.
Campbell, G.A., et al., "A method for measuring *Escherichia coli* O157:H7 at 1 cell/mL in 1 liter sample using antibody functional piezoelectric-excited millimeter sized cantilever sensor," Paper submitted on-line to J. of Analytical Chemistry. 1-23. in Jan. 2007.
Capobianco, J. A., et al., "Methyltrimethoxysilane- insulated piezoelectric microcantilevers for direct, all-electrical biodetection in buffered aqueous solutions", Rev. Sci, lnstrum., 77: 125105-1-125105-6 (2006).
Capobianco, J. A., et al., "3-mercaptopropyltrimethoxysilane as insulating coating and surface for protein immobilization for piezolectric microcantilever sensors",Rev. Sci. Instrum., 77: 125105-1-125105-6 (2006).
Carlier, S. G., et al., "Elastography", J. Cardiovasc Risk, 9(5): 237-245 (2002).
Carr, D.W., et al., "Fabrication of nanoelectromechanical systems in single crystal silicon using silicon on insulator substrates and electron beam lithography," J. Vac. Sol. Technology, B, 5(6), 2760-2763, in Dec. 1997.
Che, G. et al., "Molecular recognition based on (3-mercaptopropyl) trimethoxysilane modified gold electrodes", J. Electroanalytical Chem., 417: 155-161 (1996).
Chen, G. Y. et al., "Adsorption-induced surface stress and its effects on resonance frequency of microcantilevers", J. Appl. Phys., 77(8): 3618-3622 (1995).
Chen, X. et al., "Electrochemical and Spectroscopic Characterization of Surface Sol-Gel Processes", Langmuir, 20 (20): 8762-8767 (2004).
Cho, S. H. et al., "Micro-scale metallization on flexible polyimide substrate by Cu electroplating using SU-8 photoresist mask", Thin Solid Films, 475: 68-71 (2005).
Duval, F.F.C. et al., "Stable TiO2/Pt electrode structure for lead containing ferroelectric thick films on silicon MEMS structures", Thin Solid Films, 444: 235-240 (2003).
Feili, D. et al., "Encapsulation of organic field effect transistors for flexible biomedical microimplants", Sensors and Actuators, A120: 101-109 (2005).
Ferrini, R. et al., "Screening Mammography for Breast Cancer: American College of Preventive Medicine Practice Policy Statement", www.acpm.org/breast, pp. 1-4 (2005).
Fritz, J. et al., "Translating Biomolecular Recognition into Nanomechanics", Science, 288: 316-318 (2000).
Fung, Y. S. et al., "Self-Assembled Monolayers as the Coating in a Quartz Piezoelectric Crystal Immunosensor to Detect Salmonella in Aqueous Solution", Anal. Chem., 73: 5302-5309 (2001).
Gao, L. et al., "Imaging of the elastic properties of tissue: A review", Ultrasound in Med. & Biol., 22(8): 959-977 (1996), Abstract Only.
Greenleaf, J. F. et al., "Selected Methods for Imaging Elastic Properties of Biological Tissues", Annu. Rev. Biomed. Eng., 5: 57-78 (2003).
Gu, H. et al., "Single-Calcination Synthesis of Pyrochlore-Free 0.9Pb(Mg1/3Nb2/3)O3-0.1PbTiO3 and Pb (Mg1/3Nb2/3)O3 Ceramics Using a Coating Method", J. Am. Ceram. Soc., 86(2): 217-221 (2003).
Haccart, T. et al, "Evaluation of niobium effects on the longitudinal piezoelectric coeffecients of Pb(Zr,T1)O3 thin films", Appl. Phys. Left., 76(22): 3292-3294 (2000).
Han, W. et al., "A magnetically driven oscillating probe microscope for operations in liquids", Appl. Phys. Lett., 69(26): 4111-4113 (1996).

(56) References Cited

OTHER PUBLICATIONS

Hiboux, S. et al., "Mixed titania-lead oxide seed layers for PZT growth on Pt(111): a study on nucleation, texture and properties", J. Europe. Ceram. Soc., 24: 1593-1596 (2004).
Hwang, I.H. et al., "Self-actuating biosensor using a piezoelectric cantilever and its optimization", Journal of Physics: Conference Series 34, pp. 362-367, 2006.
Hwang, K.S. et al., "In-situ quantitative analysis of a prostate-specific antigen (PSA) using a nanomechanical PZT cantilever", Lab Chip, 4: 547-552 (2004).
Ilic, B. et al., "Mechanical resonant immunospecific biological detector", Appl. Phys. Lett., 77(3): 450-452 (2000).
Itoh. et al., "Self-excited force-sensing microcantilevers with piezoelectric thin films for dynamic scanning force microscopy", Sensor and Actuators, A54:477-481 (1996).
Jung, S.K. et al., "Polymeric Mercaptosilane-Modified Platinum Electrodes for Elimination of Interferants in Glucose Biosensors", Anal. Chem., 68: 591-596 (1996).
Kanda, T. et al., "A flat type touch probe sensor using PZT thin film vibrator", Sensors and Actuators, 83: 67-75 (2000).
Katiyar, P. et al. "Electrical properties of amorphous aluminum oxide thin films", Acta Materialia, 53: 2617-2622 (2005).
Keller, A. et al., "Reliability of Computed Tomography Measurements of Paraspinal Muscle Cross-Sectional Area and Density in Patients With Chronic Low Back Pain", Spine, 28(13): 1455-1460 (2003).
Kelly, J. et al., "Effect of Composition on the Electromechanical Properties of (1-x)Pb(Mg1/3Nb2/3)O3-xPbTiO3 Ceramics" J. Am. Ceram. Soc., 80(4): 957-964 (1997).
Khabari, A. et al., "Partially ionized beam deposition of parylene" J. Non-Crystalline Solids, 351: 3536-3541 (2005).
Kim, S.H. et al., "Influence of Al2O3 diffusion barrier and PbTiO3 seed layer on microstructural and ferroelectric charachteristics of PZT thin films by sol-gel spin coating method," Thin Solid Films, 305: 321-326 (1997).
Kim, S.J. et al., "Fabrication and Characterization of Pb(Zr,Ti)O3 Microcantilever for Resonance Sensors," Jpn. J. Appl. Phys., 42(3): 1475-1478 (2003).
Klissurska, R.D. et al. "Microstructure of PZT sol-gel films on Pt substrates with different adhesion layers," Microelectronic Engineering, 29: 297-300 (1995).
Kruse, S.A. et al., "Tissue characterization using magnetic resonance elastography: preliminary results," Phys. Med. Biol., 45: 1579-1590 (2000).
Kumar, V. et al., "A Simple System for the Preparation of Submicrometer Lead Titanate Powders by the Sol-Gel Method," J. Am. Ceram. Soc., 79(10): 2775-2778 (1996).
Kwok, CLK. et al., "Low temperature perovskite formation of lead zirconate titanate thin films by a seeding process," J. Mater. Res., 8(2): 339-344 (1993).
Lee, C. et al., "Sol-gel derived PZT force sensor for scanning force microscopy", Mater. Chem, Phys., 44: 25-29 (1996).
Lee, C. et al., "Self-excited piezoelectric PZT microcantilevers for dynamic SFM—with inherent sensing and actuating capabilities", Sensors and Actuators, A72: 179-188 (1999).
Lee, J. H. et al "Label free novel electrical detection using micromachined PZT monolithic thin film cantilever for the detection of C-reactive protein", Biosensors and Bioelectronics, 20: 269-275 (2004).
Lee, J. H. et al., "Effect of mass and stress on resonant frequency shift of functionalized Pb(Zr0.52Ti0.48)O3 thin film microcantilever for the detection of C-reactive protein", Appl, Phys. Lett., 84(16): 3187-3189 (2004).
Lee, J. H. et al., "Immunnoassay of prostate-specific antigen (PSA) using resonant frequency shift of piezoelectric nanomechanical microcantilever", Biosensors and Bioelectronics, 20: 2157-2162 (2005).
Lee, S. S. et al., "Self-Excited Piezoelectric Cantilever Oscillators", The 8th International Conference on Solid-State Sensors and Actuators, and Eurosensors IX, Stockholm, Sweden: 417-420 (1995).

Lee, Y, et al., "A Piezoelectric Micro-Cantilever Bid-Sensor Using the Mass-Microbalancing Technique With Self-Excitation", The 13th International Conference on Solid-State Sensors, Actuators, and Microsystems, Seoul, Korea: 644-647 (2005).
Li, S. et al., "The intrinsic nature of nonlinear behavior observed in lead zirconate titanate ferroelectric ceramic", J. Appl. Phys., 69(10): 7219-7224 (1991).
Li, X. et al., "Detection of water-ice transition using a lead zirconate titanate/brass transducer", J. Appl. Phys., 92(1): 106-111 (2002).
Lin, Z. et al.. "Operation of an Ultrasensitive 30-MHz Quartz Crystal Microbalance in Liquids", Anal. Chem., 65(11): 1546-1551 (1993).
Liu, W. et al., "Preparation and orientation control of Pb1.1(Zr0.3110.7)O3 thin films by a modified sol-gel process", Mat. Lett., 46: 239-243 (2000).
Luo, H. et al., "Synthesis of PMN and 65PMN-35PT Ceramics and Films by a New Suspension Method", Perovskite, Piezoelectric, and Dielectric Ceramics: 251-260, in 2003.
Luo, H. et al., "Comparison in the Coating of Mg(OH)2 on Micron-Sized and Nanometer-Sized Nb2O5 Particles", Int. J. Appl. Ceram. Technol., 1(2): 146-154 (2004).
Luo, H. "Colloidal Processing of PMN-PT Thick Films for Piezoelectric Sensor Applications", A Thesis Submitted to the Faculty of Drexel University in Jun. 2005.
Maki, K. et al., "Evaluation of Pb(Kr,Ti)O3 Films Derived from Propylene-Glycol-Based Sol-Gel Solutions", Jpn. J. Appl. Phys., 39(9B): 5421-5425 (2000).
Maraldo, D. et al., "Resonant-mode millimeter sized cantilever biosensor for continuous detection of proteins and pathogens in flowing liquids," Dept. of Chem. and Biological Eng., 1-21, in May 2006.
Matsui, Y. et al., "Highly Oxidation-Resistant TiN Barrier Layers for Ferroelectric Capacitors", Jpn. J. Appl. Phys., 36 (3B): 1586-1588 (1997).
Mazza, E. et al., Biomechanics, http://www.zfm.ethz.ch/e/res/bio/, 1-10, in Sep. 2004.
Mcgovern, J.P. et al., "Real-Time Salmonella Detection Using Lead Zirconate Titanate-Titanium Microcantilevers", Mater. Res. Soc. Symp. Proc., 845: AA3.8.1-AA3.8,6 (2005).
Mueller, V. et al., "Nonlinearity and scaling behavior in donor-doped lead zirconate titanate piezoceramic", Appl. Phys. Lett., 72(21): 2692-2694 (1998).
Mulvihill, M. L. et al., "The Role of Processing Variables in the Flux Growth of Lead Zinc Niobate-Lead Titanate Relaxor Ferroelectric Single Crystals", Jpn. J. Appl. Phys., 35(7): 3984-3990 (1996).
Niedziolka, J. et al., "Charaterisation of gold electrodes modified with methyltrimethoxysilane and (3-mercaptopropyl)trimethoxysilane sol-gel processed films", J. Electroanalytical Chem., 578: 239-245 (2005).
Nguyen, L. T. T. et al., "Synthesis and characterization of a photosensitive polyimide precursor and its photocuring behavior for lithography applications", Optical Materials, 29: 610-618 (2007).
Oden, P. I. et al., "Viscous drag measurements utilizing microfabricated cantilevers", Appl. Phys. Lett., 68(26): 3814-3816 (1996).
Ohnmacht, M. et al., "Microcoils and microrelays—an optimized multilayer fabrication process", Sensors and Actuators, 83: 124-129 (2000).
Park, G.T. et al., "Measurement of piezoelectric coefficients of lead zirconate titanate thin films by strain-monitoring pneumatic loading method", Appl. Phys. Lett., 80(24): 4606-4608 (2002).
Park, S.E. et al., "Ultrahigh strain and piezoelectric behavior in relaxor based ferroelectric single crystals", J. Appl. Phys., 82(4): 1804-1811 (1997).
Piezo Systems, Inc., "Piezoceraminc Sheets and Their Properties", Piezo Systems, Inc. Catalog: 1-3 (2007).
Pons, T. et al., "Solution-phase single quantum dot fluorescence resonance energy transfer", J. Amer. Chem. Soc., 128(47): 15324-15331 (2006). Abstract Only.
Ren, W. et al., "Non linear strain and DC bias induced piezoelectric behaviour of electrostrictive lead magnesium niobate-lead titanate ceramics under high electric fields", J. Phys. D: Appl. Phys., 35: 1550-1554 (2002).

(56) References Cited

OTHER PUBLICATIONS

Ren, W. et al., "Nonlinear behavior of piezoelectric lead zinc niobate-lead titanate single crystals under ac electric fields and dc bias", Appl. Phys. Lett., 83(25): 5268-5270 (2003).

Rosenberg, RD et al., "Effects of age, breast density, ethnicity and estrogen replacement therapy on screening mammographic sensitivity and cancer stage at diagnosis: review of 183,134 screening mammograms in Albuquerque, New Mexico", Radiology, 209(2): 511-5118 (1998). Abstract Only.

Saito, Y. et al., "Lead-free piezoceramics", Nature, 432: 84-87 (2004).

Schemmel, A. et al., "Single molecule force spectrometer with magnetic force control and inductive detection", Rev. Sci. Instrum., 70(2): 1313-1317 (1999).

Shen, Z. et al., "Microfabrication of Miniaturized PZT/SiO2 Piezoelectric Microcantilever for Rapid, Direct, In-situ Biosensing", MRS Fall Meeting, Boston: 1-23 (2005).

Shen, Z. et al., "Self-exciting, self-sensing PbZr0.53Ti0.47O3/SiO2 piezoelectric microcantilevers with femtogram/Hertz sensitivity", Appl. Phys. Lett., 89: 023506-1-023506-3 (2006).

Shih, W. et al., "Simultaneous liquid viscosity and density determination with piezoelectric unimorph cantilevers", J. Appl. Phys., 89(2): 1497-1505 (2001).

Shih, W. et al., "Ultrasensitive Pathogen Quantification in Drinking Water Using Highly Piezoelectric Microcantilevers", Amer. Chem. Soc., Chapter 23, 179-185 (2005).

Shih, W. et al., "Nanosensors for Environmental Applications", Nanotechnologies for the Life Sciences, 5: 271-293 (2005).

Straub, V. et al., "Contrast Agent-Enhanced Magnetic Resonance Imaging of Skeletal Muscle Damage in Animal Models of Muscular Dystrophy", Magn. Reson. Med., 44: 655-659 (2000).

Thompson, W. R. et al., "Hydrolysis and Condensation of Self-Assembled Monolayers of (3-Mercaptopropyl) trimethoxysilane on Ag and Au Surfaces", Langmuir, 13: 2291-2302 (1997).

Thundat, T. et al., "Detection of mercury vapor using resonating microcantilevers", Appl. Phys. Lett., 66(13): 1695-1697 (1995).

Tslonsky, M. et al., "Sol-Gel-Derived Ceramic-Carbon Composite Electrodes: Introduction and Scope of Applications", Anal. Chem., 66: 1747-1753 (1994).

Tu, Y. L. et al., "A study of the effects of process variables on the properties of PZT films produced by a single-layer sol-gel technique", J. Mater. Sci., 30: 2507-2516 (1995).

Udayakumar, K. R. et al., "Thickness-dependent electrical characteristics of lead zirconate titanate thin films", J. Appl. Phys., 77(8): 3981-3986 (1995).

Wang, Q.M. et al., "Nonlinear piezoelectric behavior of ceramic bending mode actuators under strong electric fields", J. Appl. Phys., 86(6): 3352-3360 (1999).

Wang, Y. et al., "Tactile Mapping of Palpable Abnormalities for Breast Cancer Diagnosis".

Ward, M. D. et al,, "In Situ Interfacial Mass Detection with Piezoelectric Transducers", Science, 249: 1000-1007 (1990).

Wellman, P. S. et al., "Breast Tissue Stiffness in Compression is Correlated to Histological Diagnosis", http://biorobotics.harvard.edu/pubs/mechprops: 1-15.

Wellman, P. S. et al., "Tactile Imaging of Breast Masses", Arch. Surg., 136: 204-208 (2001).

PIEZOELECTRIC MICROCANTILEVERS AND USES IN ATOMIC FORCE MICROSCOPY

STATEMENT OF GOVERNMENT INTEREST

This invention was reduced to practice with Government support under Grant No. R01 EB000720 awarded by the National Institutes of Health; the Government is therefore entitled to certain rights to this invention.

BACKGROUND OF THE INVENTION

1. Field of the Invention

The invention relates to piezoelectric microcantilevers for use in atomic force microscopy. More specifically, the invention relates to high sensitivity piezoelectric microcantilevers capable of both static contact imaging and dynamic non-contact imaging.

2. Description of the Related Technology

Atomic force microcopy (AFM) is a method for imaging a specimen with nanoscale resolution. AFM generally utilizes a piezoelectric actuator, deflection sensor and microcantilever probe to detect forces between a specimen and a microcantilever probe, such as mechanical contact forces, van der Waals forces, capillary forces, chemical bonding, electrostatic forces, magnetic forces, etc. The movement of the probe is measured by an optical system by measuring the displacement of the probe. A microcantilever probe is capable of generating a high-resolution image of specimen on an atomic scale.

AFM has two standard operational modes: static contact imaging and dynamic non-contact imaging. In static contact imaging, the tip maintains constant contact with a specimen during scanning. As the tip encounters topographical features of the surface, the microcantilever is deflected or bent. The microcantilever induces a change in voltage responsive to these deflections, and a feedback system controls the distance between the microcantilever and the surface of the specimen so as to maintain a relatively constant force between the tip and specimen surface. In the feedback system, a signal representative of the deflection of the microcantilever is compared against a reference voltage to produce an error signal. Using the feedback electronics to maintain the error signal at or near zero, an output is generated which both maintains the error signal at or near zero by changing the tip-sample spacing, and generates a graphic representation of the surface of the specimen.

Static contact imaging may also involve intermediate tapping of the specimen surface. In a gaseous medium, a microcantilever is oscillated at its resonant frequency and positioned above the surface so that it only taps the surface during a fraction of its oscillation period. Lateral forces are therefore significantly reduced as the tip scans the specimen surface. Tapping is particularly useful when imaging poorly immobilized or soft samples. Tapping may also be applied to a specimen located in a liquid medium, such as in situ DNA, in order to reduce van der Waals forces and eliminate capillary forces between a microcantilever tip and a specimen.

In dynamic non-contact imaging, the cantilever is externally oscillated above a specimen surface at or close to its resonant frequency. The amplitude of oscillation, phase and resonance frequency are modified by the force interaction between the microcantilever probe and specimen. As the microcantilever scans the specimen, the distance between the probe and specimen surface features varies, causing a change in the force gradient. Resultant changes in amplitude of oscillation, frequency or phase of the microcantilever are detected, and a feedback system maintains a substantially constant separation between the microcantilever probe and specimen.

The materials and methods for fabricating piezoelectric microcantilevers significantly influence detection sensitivity and the capability of operating in different AFM imaging modes. Microcantilever probes have previously been constructed from materials having piezoelectric and ferroelectric properties such as Si, $Si_3N_4$, ZnO and lead-zirconate-titanate (PZT). Of these, bulk PZT, which has a piezoelectric constant of $-d_{31}=320$ pm/V, dielectric constant of about 3800 and thicknesses of $\geq 127$ μm, (See www.piezo.com/prodsheet2sq5H.html) offers the most promising properties, but, due to its thickness, is not suitable for use in microcantilevers.

Since resonance sensitivity is inversely proportional to the thickness of the piezoelectric layer of a microcantilever, a current trend in the AFM field is the development of highly sensitive thin film piezoelectric microcantilevers capable of mimicking or outperforming ZnO wires or PZT films. Reducing the microcantilever size, however, diminishes resonance-peak height, rendering the cantilever incapable of high sensitivity detection. Previous strategies for improving PEMS resonance peak height have included amplifying the piezoelectric voltage and reducing the noise with a bridge circuit, incorporation of a piezoelectric patch of the same material and dimension as the PEMS on a silicon substrate, and/or replacing ZnO wires, having piezoelectric coefficients in the range of $-d_{31}=-4$ pm/V and $d_{33}=12.4$ pm/V, with PZT films.

Most PZT films exhibit piezoelectric coefficients ranging from $-d_{31}=58$ pm/V[20] to $d_{33}=190$ to 250 pm/V. Although these values are much higher than those of ZnO, they are only about 20 to 40% of commercial bulk PZT, due to problems with interfacial diffusion and substrate pinning. Prior art methods have been unable to effectively achieve thin self-actuating and self-detecting PEMS having a level of sensitivity comparable to bulk PZT. Thus far, it has not been possible to construct a highly sensitive microcantilever by simultaneously simplifying and miniaturizing detection and actuation elements without sacrificing AFM performance and imaging resolution.

In an attempt to create a more sensitive microcantilever, researchers have developed PZT thin film cantilevers having a piezoelectric constant of $-34.2$ pm/V, 37% of bulk PZT, and sensitivity of $2.0 \times 10^{-2}$ mV/nm (Kanda et al., "A flat type touch probe sensor using PZT thin film vibrator," *Sensors and Actuators* 83 (2000) 67-75). Also known are PZT microcantilevers, fabricated using a sol gel method, having a thickness of 4.15 um and sensitivity of 0.44 fC $nm^{-1}$, which is three times the sensitivity of ZnO microcantilevers.

Due to differences in microstructure and mechanical and thermal stresses at the film-substrate interface, the PZT microcantilever, which is capable of cyclic dynamic imaging, has a dielectric constant of only 850, piezoelectric constant of -27 pm/V and sensitivity of 0.44 fC $nm^{-1}$ (T. Itoh, et al., "Sol-gel derived PZT force sensor for scanning force microscopy," *Materials Chemistry and Physics* 44 (1996) 25-29; Lee, Chengkuo et al., "Self-excited piezoelectric PZT microcantilevers for dynamic SFM-with inherent sensing and actuating capabilities," *Sensors and Actuators* A72 (1999) 179-188.)

Researchers have also been investigating the concept of incorporating electrical insulation in a microcantilever to prevent liquid damping. U.S. Patent Publication no. 2005/0112621 discloses an insulation layer surrounding a PZT microcantilever having a thin piezoelectric film in order to prevent conduction in liquid media (See e.g. col. 4, lines 28-36).

These piezoelectric in-solution cantilevers however lack sufficient sensitivity for many AFM applications. Therefore, there remains a significant need to develop highly piezoelectric AFM microcantilevers capable of in-solution detection, operating in both an alternating current mode and a direct current mode and having a femtogram or better sensitivity.

SUMMARY OF THE INVENTION

In a first aspect, the present invention is directed to piezoelectric microcantilevers useful for static contact and/or dynamic non-contact atomic force microscopy. The piezoelectric microcantilever, which includes a piezoelectric layer and non-piezoelectric layer is capable of self actuation and detection.

The microcantilever may be constructed from piezoelectric lead magnesium niobate-lead titanate $(Pb(Mg_{1/3}Nb_{2/3})O_3)_{0.65}$—$(PbTiO_3)_{0.35}$ $(PMN_{0.65}-PT_{0.35})$ (PMN-PT) which typically has a thickness not greater than 50 µm with a dielectric constant of greater than 1600.

In a second aspect, the piezoelectric layer of the microcantilever is constructed from lead zirconate titanate (PZT) which typically has a thickness not greater than 2 µm with a dielectric constant of greater than 1600.

In another aspect, the present invention is directed to methods for performing atomic force microscopy using piezoelectric cantilevers. Such methods include both static contact and/or dynamic non-contact atomic force microscopy.

BRIEF DESCRIPTION OF THE DRAWINGS

FIG. 2($b$) shows Q values corresponding to a microcantilever with a 22 µm thick PMN-PT layer and a 5 µm thick Cu layer.

FIG. 4($b$) is a graph of cantilever length versus the associated Q factor of PZT/SiO$_2$ and PMN-PT PEMS.

FIG. 8($b$) shows the resonance spectra of a PMN-PT PEMS array having a length of about 500 µm and a width of about 800 µm.

FIG. 9($b$) shows a 50 µm long 20 µm wide PZT/SiO$_2$ microcantilever with a 10 µm long SiO$_2$ tip.

FIG. 9($c$) shows the resonance frequency spectrum for a PZT/SiO$_2$ microcantilever of FIG. 9($b$).

FIG. 10($b$) shows an x-ray diffraction pattern of a 20 µm PMN-PT thick film.

FIG. 10($c$) is a SEM micrograph of the cross section of the film.

FIG. 10($d$) is an x-ray diffraction pattern of an 8 µm thick PMN-PT freestanding film.

FIG. 11($b$) shows a SEM micrograph of a 60×25 µm PZT/SiO$_2$ PEMS with a 24×20 µm SiO$_2$ extension (PEMS-2).

FIG. 11($c$) shows a SEM micrograph of an ICP-etched PZT surface.

FIG. 12($b$) shows the resonance frequency spectra of PEMS-2.

FIG. 13($b$) is a graph of resonance frequency shift versus relative humidity of a 40 µm long PZT/SiO$_2$ PEMS.

FIG. 16($b$) is a graph of dielectric coefficient $-d_{31}$ as a function of the applied electric field for a Sb—NKNLN free-standing film and a bulk Sb—NKNLN.

DETAILED DESCRIPTION OF THE PREFERRED EMBODIMENTS

Figure 1:
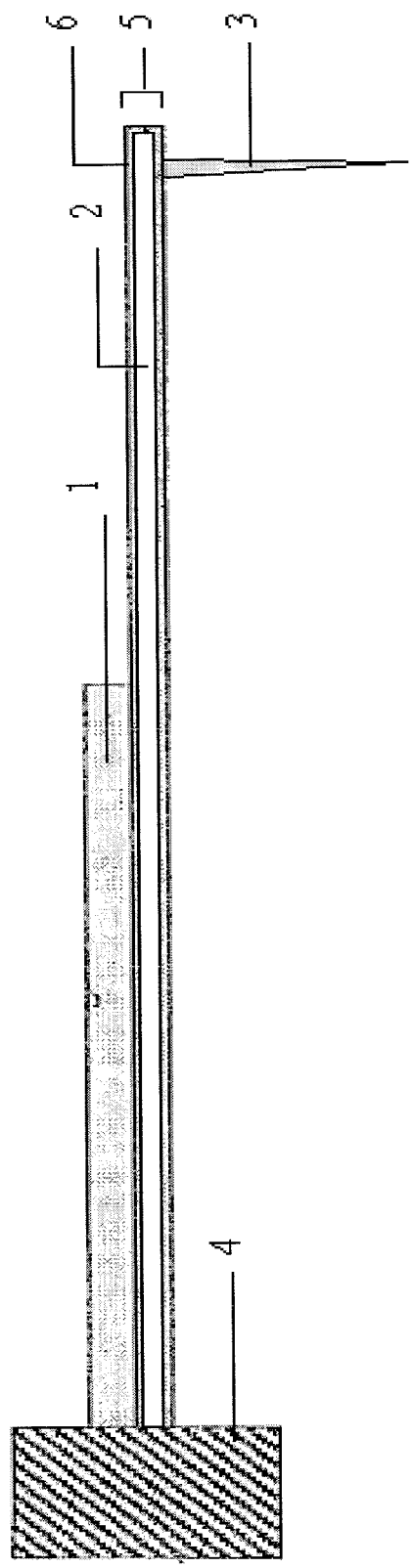
FIG. 1 shows a schematic representation of a microcantilever.

This invention is directed to a piezoelectric microcantilever sensor (PEMS) system capable of detecting force using an electrical detection means and a method for atomic force microscopy. The invention is also directed to a PEMS suitable for in-solution detection and to a method for in-solution detection. The PEMS system comprises a PEMS, power source and a means for detecting resonance frequency, for detecting a change in force when the interaction between the PEMS and a specimen shifts the mechanical resonance frequency of the device. By monitoring resonance frequency shifts of a PEMS a high-resolution image of a surface of a specimen can be generated.

The microcantilever may be driven by any suitable actuation mechanism such as, for example, a piezoelectric drive element, an electrostatic drive element, a thermal drive element, a magnetic drive element, or other suitable drive mechanism as is known in the art. When voltage is applied to the piezoelectric film, the cantilever bends according to the level of the voltage, and the forces and moments generated by the piezoelectric film. When an oscillating voltage is applied to the piezoelectric film, the cantilever may be driven at or near a natural resonant frequency and may achieve much larger amplitudes than statically driven probes. The achieved deflection amplitude may depend, for example, on the frequency and mode of oscillation, the internal damping of the probe and applied films, and viscous damping due to gas or liquids surrounding the probe.

The piezoelectric layer generates a signal based on the static and dynamic deflections of cantilever. The generated signals may be used to determine static deflections, quasi-static deflections, oscillation amplitudes and frequencies of the cantilever. A piezoelectric film such as a PZT or PMN-PT layer may be used to generate a signal when the cantilever is displaced or vibrated. The same piezoelectric film may be used to drive cantilever into oscillation, as well as to sense the displacements Control circuitry may be provided to control the cantilever. The control circuitry typically comprises circuits and electronic devices to drive the cantilever into oscillation and to measure deflection amplitudes of the oscillating cantilever. Control and monitoring of the cantilever and positioning elements may be done with control circuitry. Control circuitry may include, for example, drive circuitry and sensing circuitry. Drive circuitry and sensing circuitry cooperate to drive the cantilever into oscillation using a suitable drive element, as described above. Drive circuitry and sensing circuitry may cooperate to measure deflection amplitudes of the cantilever with any suitable sensing element such as an optical sensing element, a piezoelectric sensing element, a piezoresistive sensing element, a capacitive sensing element, or a magnetic sensing element.

The cantilevers may be arranged in an array, the cantilevers being all identical, all different, or some combination thereof. An array of cantilevers may be attached to a common base. The array of cantilevers may be driven and sensed, for example, with a unitary piezoelectric element coupled to each cantilever. In one embodiment, the unitary piezoelectric elements in the array may be connected in series. The series-connected piezoelectric elements in the array may be driven with as few as two electrical connections to the piezoelectric element array. In this case, scanning the drive voltage through a range of frequency can excite and sense one cantilever at a time, allowing interrogation of any probe in the array while minimizing the number of electrical connections required. In another configuration, the piezoelectric elements in the array are connected in parallel, such that as few as two electrical connections may be used to drive and sense the cantilevers. In another configuration, the array of piezoelectric elements is connected in a series-parallel arrangement.

FIG. 1 shows the primary structure of a PEMS including a microcantilever constructed from a piezoelectric layer 1 bonded to a longer non-piezoelectric layer 2, an optional insulation layer 6 which may be used for in-solution detection applications, surrounding the piezoelectric layer, and a scanning needle 3, extending from a surface of the microcantilever. Both piezoelectric layer 1 and non-piezoelectric layer 2 are attached to clamp 4.

An important aspect of the microcantilever structure is the fabrication of a highly piezoelectric layer 1, which enables a means for electrical detection and actuation within the cantilever. The piezoelectric layer 1 may be constructed from any piezoelectric material, including $(Na_{0.5}K_{0.5})_{0.945}Li_{0.055}Nb_{0.96}Sb_{0.04}O_3$ (hereinafter "Sb—NKNLN"), Sb—$(Na_{0.5}K_{0.5})NbO_3$—$LiTaO_3$ (hereinafter "Sb—NKNLT"), Sr—$(Na_{0.5}K_{0.5})NbO_3$—$LiTaO_3$ (Sr—NKNLN), Sr—$Na_{0.5}K_{0.5})NbO_3$—$LiTaO_3$ (Sr—NKNLT), SbSr—$(Na_{0.5}K_{0.5})NbO_3$—$LiTaO_3$ (SrSb—NKNLN), SrSb—$Na_{0.5}K_{0.5})NbO_3$—$LiTaO_3$ (SbSr—NKNLT), solid solutions with $(Bi_{0.5}K_{0.5})TiO_3$, $(Bi_{0.5}Na_{0.5})TiO_3$, $Ba(Zr_xTi_{1-x})O_3$, $BaTiO_3$ (hereinafter "BT"), $(Bi_{1/2}K_{1/2})TiO_3$ (hereinafter "BKT"), $(Bi_{1/2}Na_{1/2})TiO_3$ (hereinafter "BNT"), $Ba(Zr_xTi_{1-x})O_3$ (hereinafter "BZT"), $Bi(Zn_{1/2}Ti_{1/2})O_3$ (hereinafter "BiZT"), $(Na_xK_{1-x})NbO_3$ (hereinafter "NKN"), $BiScO_3$—$PbTiO_3$ $BaTiO_3$—$(Bi_{1/2}K_{1/2})TiO_3$ (hereinafter "BKBT"), $(Bi_{1/2}Na_{1/2})TiO_3$—$(Bi_{1/2}K_{1/2})TiO_3$ (hereinafter "BNKT"), $(Bi_{1/2}Na_{1/2})TiO_3$—$BaTiO_3$ (hereinafter "BNBT"), $(Bi_{1/2}Na_{1/2})TiO_3$—$Ba(Zr_xTi_{1-x})O_3$ (hereinafter "BNBZT") and $(Bi_{1/2}Na_{1/2})TiO_3$—$BaTiO_3$—$(Bi_{1/2}K_{1/2})TiO_3$ (hereinafter "BNBK"). In a preferred embodiment, piezoelectric layer 1 is formed from highly piezoelectric lead magnesium niobate-lead titanate solid solutions e.g. $(Pb(Mg_{1/3}Nb_{2/3})O_3)_{0.65}$—$(PbTiO_3)_{0.35}$ ($PMN_{0.65}$-$PT_{0.35}$) (PMN-PT) films. Additionally, piezoelectric layer 1 may be fabricated in any form, preferably having free standing film geometry to enhance domain wall motion and piezoelectric performance.

Despite their excellent piezoelectric properties, few studies have investigated the possibility of creating a PMN-PT microcantilever because of the difficulty in fabricating single phase PMN-PT. In the present invention, PMN-PT PEMS is fabricated according to a novel precursor-coated powder suspension (PCPS) method. Submicron crystalline PMN powder is first prepared by dispersing $Mg(OH)_2$-coated $Nb_2O_5$ particles in a lead acetate/ethylene glycol solution followed by calcination at about 800° C. The crystalline PMN powder is subsequently suspended in a PT precursor solution containing lead acetate and titanium isopropoxide in ethylene glycol to form a PMN-PT precursor powder which can be sintered at a temperature as low as about 900° C. The combination of using sinterable PMN powders and the elimination of defects created by placement of thin films on substrates, produces superior PMN-PT films. This technique is robust and can be readily applied to other lead based piezoelectric materials and non-lead-based materials as well.

For polycrystalline piezoelectric ceramics, including PMN-PT, to be useful, they must be polarized in order to have high piezoelectric coefficients. Before polarization, the orientations of domains are random with no net polarization. After polarization, many domains are aligned or switched to the direction of the applied electric field resulting in a finite polarization. However, the domains in polycrystalline materials are not as easily aligned as in a single crystal. The PMN-PT films are geometrically structured so as to align the polarization in the plane of the film.

The resulting freestanding PMN-PT films are electroplated on one side with sputtered 30 nm thick nickel/platinum (Ti/Pt). A copper layer of appropriate thickness is then electroplated on the Pt surface to create a non-piezoelectric layer, followed by the deposition of the Ti/Pt electrode on the other face of the film. A PMN-Pt/Cu bilayer is then embedded in wax and cut or chemically etched to form a cantilever shape with a wire saw. A novel aspect of this invention is the ability to construct a microcantilever from one piece of PMN-PT film without having to separately attach the non-piezoelectric and piezoelectric layers. Additionally, because the cantilevers thus fabricated have clean interfaces between the PMN-PT layer and the electrodes, the cantilevers exhibit high Q values above 300. The resultant clean geometry of the microcantilever increases sensitivity and facilitates the manufacturing process.

The resulting suspensions yield PMN-PT freestanding films 8-75 μm thick at 1000° C. Preferably, the thickness is less than 50 μm or less than 8 μm. The precursor-suspension method may also be used to produce freestanding PMN-PT films having a thickness of less than 5 μm and length of less than 100 μm or a film having a thickness of less than 4 μm. These freestanding PMN-PT films typically have femtogram sensitivity of at least $2\times10^{-14}$ g/Hz, dielectric constants ($d_{31}$) greater than 250 pm/V, more preferably, greater than 1000 pm/V, saturated polarization of about 30 μC/cm², remnant polarization of 25 μC/cm² and a Q value as high as 300 and as low as 20, where Q is defined as the ratio of the resonance frequency to the resonance peak width at half the peak height. Therefore PMN-PT microcantilevers are capable of generating higher-mode resonance peaks resulting in enhanced sensitivity detection.

Figure 2A:
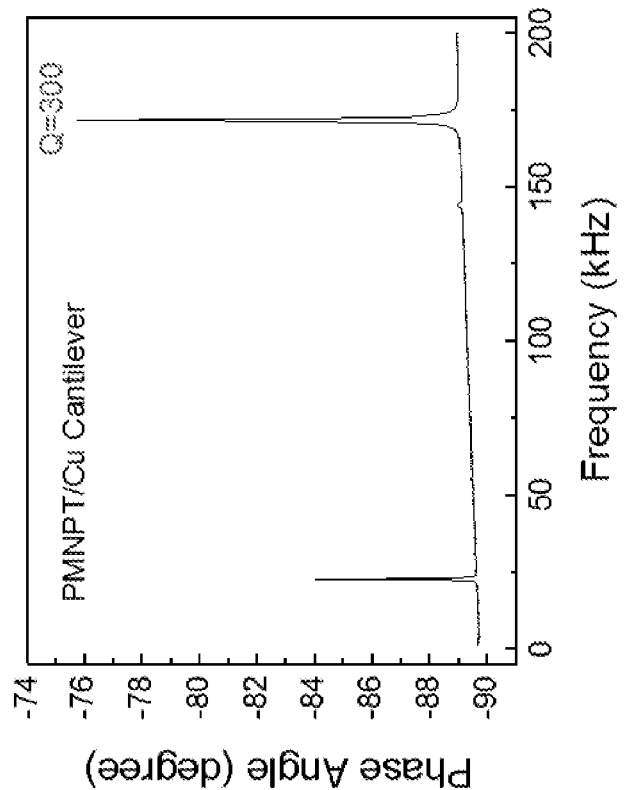
FIG. 2($a$) is a graph of the piezoelectric $-d_{31}$ coefficients for 22 µm and 8 µm thick PMN-PT freestanding films. Up (down) triangles indicate results were obtained when the field was ramped up (down). For comparison, the data for commercial PZT and PMN-PT bulk ceramic are also known.

Significantly, 22 μm and 8 μm thick PMN-PT freestanding films exhibit an unprecedented, extremely high electric-field enhanced piezoelectric $-d_{31}$ coefficient of 2000 pm/V at E=10 kV/cm, as shown in FIG. 2(a), which is about 7 times that of the bulk PMN-PT and commercial PZT and which also exceeds the piezoelectric coefficient of specially-cut single crystalline PMN-PT. The piezoelectric coefficient $d_{31}$ is calculated according to (Equation 1)

$$d_{31} = \frac{h_{can}}{3VL^2} \cdot \frac{E_1^2 t_1^4 + E_2^2 t_2^4 + 2E_1 t_1 E_2 t_2 (2t_1^2 + 2t_2^2 + 3t_1 t_2)}{E_1 E_2 t_1 (t_1 + t_2)(1-v)},$$ (Equation 1)

where V is the applied voltage, L, the cantilever length, v the Poisson ratio, $E_1$, and $E_2$ ($t_1$ and $t_2$) are the Young's modulus (thickness) of copper and that of PMN-PT, respectively. The large piezoelectric coefficient $d_{31}$ is believed to be due to (1) low-temperature sinterable PMN-PT powder that enables the film to sinter below 1000° C. to avoid lead loss and maintain the correct stoichiometry, and (2) freestanding film geometry that aligns the polarization in the plane of the film. Polarization reorientation by the applied electric field, normal to the film, enhances the piezoelectric coefficient.

In another embodiment a PEMS may be constructed from highly piezoelectric lead zirconate titanate (PZT) bonded to a SiO₂ substrate. PZT is a ferroelectric material with large piezoelectric coefficients. (PZT)/SiO₂ PEMS may be configured as microcantilevers less than 20 μm in length having attogram sensitivity of $10^{-18}$ g/Hz, a piezoelectric layer thickness of about 1.0-μm-8 μm, more preferably, less than about 4 μm, about 1.5 μm-2 μm or less than about 2 μm, and a dielectric constant of at least 1600, more preferably, at least 1900. The PEMS is capable of exhibiting up to four resonance peaks with quality values, Q, ranging from a minimum of 20 to between 120 and 320. (PZT)/SiO₂ PEMS may also be configured to have a thickness of less than 2 μm and a length of less than 30 μm. The dielectric constants can be further raised to above 2000 and up to about 3000 by any standard method of doping the piezoelectric layer.

PZT/SiO₂ microcantilevers may be formed on silicon wafers and later glued onto a glass substrate to form an array. It is also possible to fabricate thin PZT films, of 1.0 to 2.0 μm in thickness, on a variety of different substrates using a sol-gel process.

Figure 3:
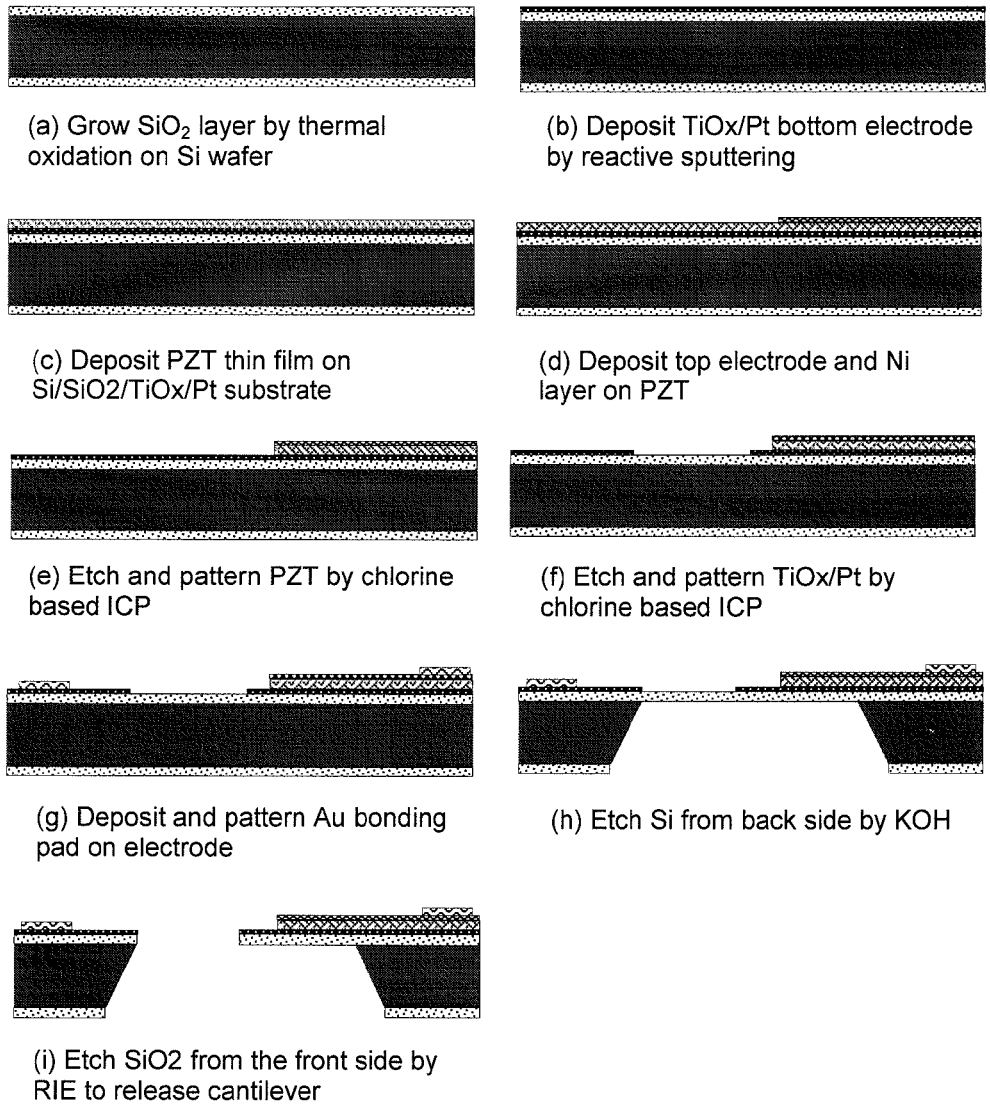
FIG. 3 shows a micro-fabrication procedure for constructing PZT/SiO$_2$.

FIG. 3 depicts a preferred micro-fabrication procedure for constructing PZT/SiO₂ piezoelectric microcantilever sensors. A low-stress SiO₂ substrate, 2-μm in thickness, is deposited on a front-side and back-side of a (100)-oriented silicon wafer by steam oxidation at 800° C. The front-side of the SiO₂ constitutes the non-piezoelectric layer of the microcantilever, and the back-side of the SiO₂ forms an etching mask, wherein the silicon wafer is wet etched using KOH.

A 400 Å thick TiO₂ bonding layer is then deposited by reactive sputtering of Ti followed by the deposition of the 1500 Å-thick platinum bottom electrode. Reactive sputtering of Ti is carried out at 15 mTorr of 80% oxygen and 20% helium. To prepare for deposition of the platinum electrode, a stage or platform is heated up to 650° C. at a rate of 5° C./min. The RF power may be adjusted to the expected deposition rate. After deposition, the stage is cooled to room temperature at a rate of 5° C./min to avoid residue stress. Sputtering of the platinum bottom electrode begins when the stage reaches room temperature. The resultant platinum bottom electrode is optimally 1500 Å in thickness.

A 1.5-μm thick PZT layer is deposited on the Pt/TiO₂/SiO₂/Si substrate using a novel sol gel method with repeated spin coatings and heat treatments. According to the sol gel method, titanium isopropoxide and lead acetate is dissolved in ethylene glycol and zirconium-n-propoxide in 2-propanol. The dissolved components are mixed to obtain a PZT precursor solution. The precursor solution also contains a 50% excess of lead to compensate for lead loss during repeated heat treatment. The PZT thin films are then deposited by repeated spin coating on a Pt/TiO₂/SiO₂ substrate followed by pyrolysis at 350° C. for 12 min and sintering at 650° C. for 2 hours after every 5 depositions. The Pt/TiO₂/SiO₂ substrate is formed by depositing a 2-μm thick low-stress SiO₂ on a silicon wafer through steam oxidation, depositing 40 nm of Ti on the SiO₂ by sputtering and oxidization at 800° C. and depositing 150 nm Pt by sputtering to prevent undesired interfacial reaction and diffusion. The TiO₂ buffer and a SiO₂ layer, having a thickness larger than 0.5 μm, effectively eliminate diffusion between the PZT layer and the substrate.

After forming the PZT layer, a top electrode, Pt/Ti or Au/Cr, is deposited by E-gun evaporation in high vacuum ($2\times10^{-6}$ torr or lower) to avoid oxidation of metal, particularly oxidation of the Cr layer. E-gun evaporation is gentler than sputtering or thermal evaporation and avoids damaging the PZT layer. The thickness of the resultant Ti or Cr bonding layer is approximately 5-40 nm thick and the resultant Pt or Au electrode layer is approximately 100-200 nm thick. A nickel layer is deposited on the top electrode to form a hard mask for protecting the top electrode and the underlying PZT during dry etching. The Ni and the top electrode are patterned using an over-hang lift-off process. LOR10B and SPR3012 photoresists are recommended for executing the over-hang lift-off process, and the thickness of undercut photoresist (LOR) is about 0.8 to 1.2 μm, approximately 1.5 times larger than the metal layer. The selectivity or etching rate ratio of PZT to Ni is nearly 5:1. The thickness of the resultant Ni layer should be 0.3-0.5 μm depending on the PZT thickness.

The exposed PZT and TiO₂/Pt bottom electrode is patterned by a chlorine-based inductively coupled plasma (ICP) dry etching process using a chlorine etching gas to expose SiO₂ and 150 sccm flow rate. The pressure of the etching chamber is set to below 10 mTorr. The RF power may be adjusted to the etching rate. Since the PZT is a ceramic material and the nickel etching mask is stable at high temperatures, a high RF power of about 400 W is recommended for PZT dry etching. The selectivity ratios of the PZT dry etching process are 5:1 for Ni and 8:1 for Pt. The etching mask for the bottom electrode is a thick photoresist such as one in the SPR220 series. Because the etching mask is a photoresist, a low RF power is recommended for this etching process. A silver glue is used to fill spaces between the sample and the stage to help dissipate heat during etching. For every 5 min of etching, a 20-min cooling period is required. If the etching temperature is kept below 120° C., the PR can be removed easily by acetone after etching.

The silicon dioxide on the back-side was patterned by photolithography and the exposed silicon dioxide was etched by $CF_4/CHF_3$ based reactive ion etching (RIE). When silicon-dioxide etching was finished, the whole front-side is sealed by black wax, and the sample is placed in a 45% potassium hydroxide (KOH) solution. The temperature of the solution is set to 55-60° C., and the KOH is used to etch the exposed silicon with the remaining silicon dioxide as an etching mask.

After etching, the black wax is dissolved using trichloroethylene (TCE) and the front side is cleaned. The exposed silicon dioxide is removed on the front side by a $CF_4/CHF_3$-based reactive ion etching (RIE). The top electrode and bottom electrode work together because the mask and the selectivity ratios are very high. If desired, the etching duration may be increased to ensure that all the silicon dioxide is removed and the cantilevers are released.

After rinsing with acetone, 2-proponal and deionized water, free-standing $PZT/SiO_2$ piezoelectric microcantilever sensors are obtained. A novel aspect of this invention is the ability to construct a microcantilever from one piece of $PZT/SiO_2$ film without having to separately attach the non-piezoelectric and piezoelectric layers. Because the cantilevers thus fabricated have clean interfaces between the $PZT/SiO_2$ layer and the electrodes, the cantilevers exhibit high Q values. The resultant clean geometry of the microcantilever increases sensitivity and facilitates the manufacturing process.

The self-actuating and self-detecting PEMS piezoelectric layers 1, constructed using the PMN-PT and $PZT/SiO_2$ microfabrication methods, overcome a significant problem of the prior art, enabling reduction of microcantilever size for purposes of enhancing resonance sensitivity while maintaining resonance-peak heights. The sensitivity of the PEMS piezoelectric layers 1 is evidenced by the large dielectric constants, piezoelectric coefficients and quality factor values (Q values).

Figure 4A:
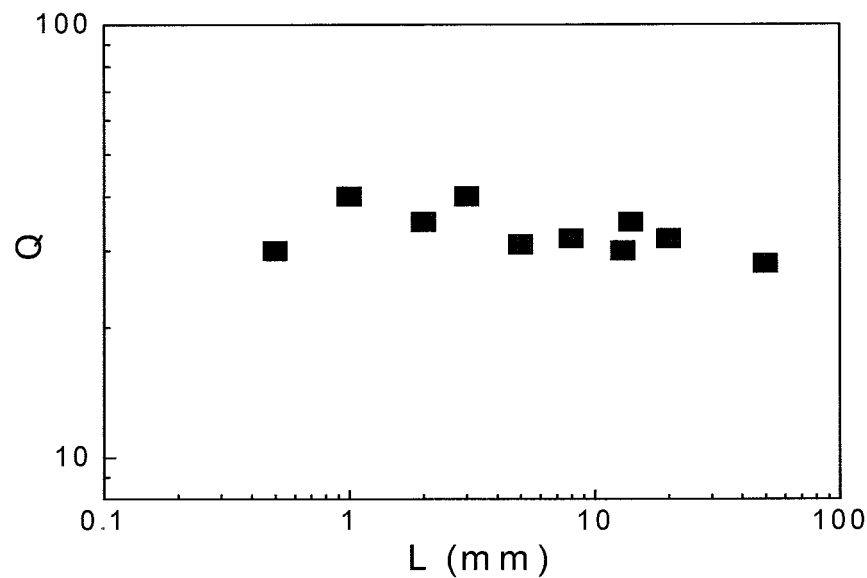
FIG. 4($a$) is a graph of cantilever length versus the associated Q factor of commercial-PZT-based microcantilevers.
Figure 4B:
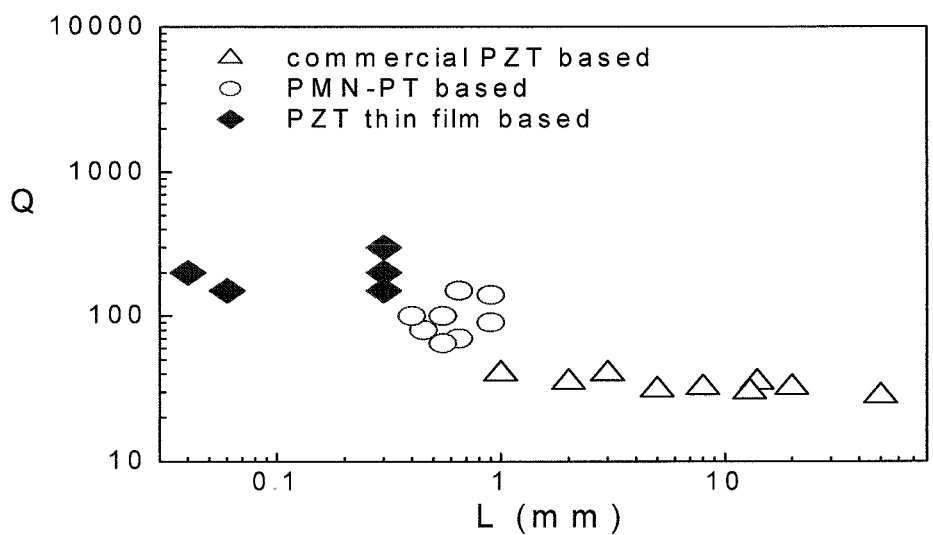

Q values are defined as the ratio of resonance frequency to peak width at half the peak height. The Q factor of silicon microcantilevers is known to decrease with cantilever size. FIGS. 4(*a*)-(*b*) compare Q factor versus cantilever length for commercial-PZT, $PZT/SiO_2$ and PMN-PT microcantilevers. The Q factor remained more or less the same although L varied over two orders of magnitude. The Q factor did not change with the piezoelectric cantilever size because the piezoelectric layer 1 in PEMS is polycrystalline. The novel piezoelectric material and manufacturing methods of the present invention therefore prevents loss of sensitivity in PEMS while minimizing cantilever size.

The piezoelectric layer 1 of the PEMS may optionally be coated with an insulation layer 6 to maintain functionality in solution by preventing conduction. The insulating layer electrically separates or buffers the conductive piezoelectric layer 1.

In one embodiment, insulating layer 6 may comprise a 1.5 µm thick parylene (poly-para-xylylene) coating deposited on an electrode by chemical vapor deposition. When placed in static and 1 ml/min flow rate of PBS solution, a parylene insulating layer 3 essentially prevents background resonance frequency shifts greater than 30 Hz and 60 Hz, respectively, over a period of 30 minutes. As a result, insulating layer 6 enables complete submersion of the microcantilever for in situ or in-solution detection while maintaining a Q value (quality value) greater than 35. For the purposes of this patent application, Q value is defined as the ratio of the resonance frequency to the resonance peak width at half the peak height.

Alternatively, a PEMS may be insulated using self-assembled monolayers with hydrophobic properties, preferably methyltrimethoxysilane (MTMS) or a combination of MTMS with parylene coatings of varying thicknesses, may also be used. When immersed in a PBS solution, an MTMS insulated piezoelectric microcantilever yields strong resonance peak intensities and prevents background resonance frequency shifts greater than 30 Hz over a period of 30 minutes.

Other insulation materials may include $Al_2O_3$, $SiO_2$ and any hydrophobic silane, having a hydrophobic group selected from the group consisting of alkyl, phenyl, alkyl halide, alkene, alkyne, and sulfhydryl. In a preferred embodiment, the insulation material is mercaptopropylsilane (MPTS), which can also function to immobilize a receptor on the cantilever.

The non-piezoelectric layer 2 of the PEMS may be fabricated from any compatible material including a ceramic, polymeric or metallic material. In a preferred embodiment, the material is silicon dioxide ($SiO_2$), silicon nitride ($Si_3N_4$), tin, titanium, copper, stainless steel and any other material that can be easily electroplated to the piezoelectric layer 1 and mixtures thereof.

In one embodiment, the non-piezoelectric layer is $Si_3N_4/SiO_2$. A $Si_3N_4$ layer single crystal silicon wafer may be prepared by low press chemical vapor deposition. A low stress silicon dioxide layer may also be deposited on a silicon nitride layer by growing micron silicon dioxide film using low temperature oxide deposition or plasma enhanced chemical vapor deposition.

The PEMS may optionally include a scanning needle 3, which can extend from a distal end of the microcantilever. The scanning needle may be separately or integrally fabricated from the microcantilever and may be constructed from any non-piezoelectric material such as Si, $Si_3N_4$, or other appropriate material.

The PEMS also includes a tip 5. The tip may be formed by a portion of the non-piezoelectric layer 2 that extends beyond the end of piezoelectric layer 1 to form a non-piezoelectric tip 5. Alternative embodiments may have a piezoelectric layer extending beyond a non-piezoelectric layer so as to form a piezoelectric tip. In order to achieve the best results, one of the piezoelectric and non-piezoelectric layers preferably extends beyond the other. However, the PEMS may also be constructed so that neither of piezoelectric layer 7 nor non-piezoelectric layer 6 extends beyond the other.

Additionally, a PEMS may include two piezoelectric layers, a driving piezoelectric layer 7 and a sensing piezoelectric layer 8, wherein a non-piezoelectric layer is placed between the piezoelectric layers. In an alternative embodiment, it is also possible to have a piezoelectric layer placed between two non-piezoelectric layers.

In a preferred embodiment, tip 5 of the PEMS may be optionally functionalized with any standard receptor such as proteins, antibodies or other compounds or molecules corresponding to a specific analyte. The receptors may be densely packed and immobilized onto, for example, a bi-functional linker modified sensor surface. Any receptor, such as specially synthesized cavitants, DNA oligonucleotides, proteins, single chain variable fragments (scFvs), enzymes, antibodies, antigens or pathogens may be bound to the tip.

Any means of adhering receptors to the sensor surface may be utilized. In a preferred embodiment, the receptors are bound to the electrodes using an immobilization coating, such as self assembled monolayers ("SAM"), MPTS and bi-functional linkers. In one embodiment, for the purpose of binding scFv, the immobilization coating may be a self assembled monolayer of 3-mercaptoproprionic acid (MPA) on a copper and gold-coated electrode activated with 1-ethyl-3-(3-dimethylaminopropy)carbodimide hydrochloride (EDC) and 5 mg/ml N-hydroxysulfosuccinimide (NHS).

The PEMS operates by detecting a shift in resonance frequency and inducing a corresponding change in voltage. It is advantageously capable of self-actuating and self-detecting. Piezoelectric materials such as PMN and PZT produce electricity via mechanical pressure on certain crystals (notably quartz or Rochelle salt); or, alternatively, electrostatic stress produces a change in the linear dimensions of the crystal. Applying an alternating current voltage across the piezoelectric layer 1 causes the PEMS to vibrate, which in turn generates electric charges that can be converted to a voltage across the piezoelectric layer 1, which monitors resonance frequency shifts. Resonance frequency shifts are determined by monitoring the $i^{th}$-mode flexural resonance frequency $f_i$, which is related to the effective spring constant, $K_e$, and effective mass, $M_e$, of the piezoelectric cantilever at the tip 5 according to (Equation 2).

$$f_i = \frac{1}{2\pi}\sqrt{K_e/M_e}. \qquad \text{(Equation 2)}$$

The PEMS provided with a feedback system is capable of simultaneously applying a force and detecting the corresponding displacement. The application of a voltage at the driving electrode 10 generates the force and the corresponding displacement is measured by detecting the induced piezoelectric voltage within the sensing electrode 11. The PEMS can measure both the compressive Young's modulus and the shear modulus of a soft material through the cantilevered tip. Thus, in an aspect of the current invention, the PEMS measures both the compressive Young's modulus and shear modulus using one single device, while at the same time increasing the sensitivity and accuracy of the measurements, relative to some commercially available devices used for this purpose.

In another aspect of the invention, a PEMS and feedback system can measure lateral and in-depth stiffness variations in soft-materials and tissues both under compression and under shear. This ability to self-excite via the driving electrode 10 and self-detect via the sensing electrode 11 allows a PEMS sensor to measure the elastic and shear properties of specimens having complex shapes.

Figure 5A:
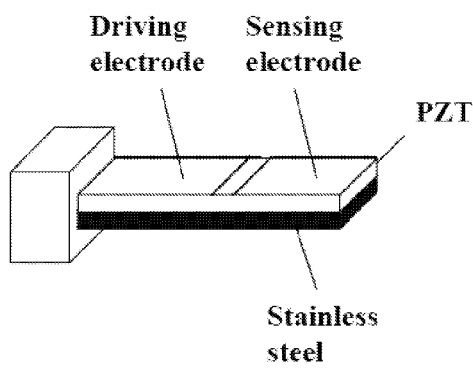
FIGS. 5($a$)-($b$) show schematics of two kinds of designs for actuating and sensing probes for a microcantilever.
Figure 5B:
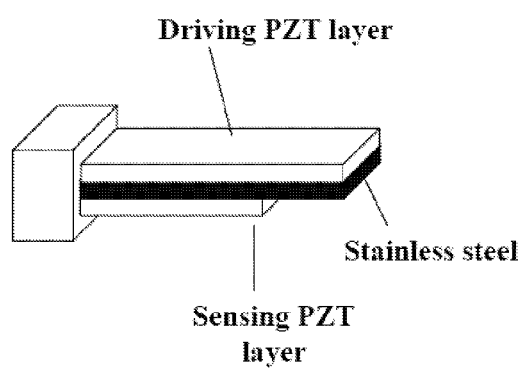

When a voltage is applied to a driving piezoelectric layer 7 of a PEMS as shown in FIG. 5(*a*)-5(*b*), it causes the PEMS to bend due to the converse piezoelectric effect, which generates a force, and therefore, a displacement at the cantilever tip. The bending of the cantilever generates an induced piezoelectric voltage in a sensing piezoelectric layer 8, which is proportional to the displacement at the cantilever tip. By carefully monitoring the displacement at the cantilever tip during a given test, an accurate determination of both the force and displacement exerted on the sample surface can be ascertained, which in turn yields an accurate determination of the elastic modulus of the sample. Moreover, by placing a sensing piezoelectric layer 8 in the device, as shown, the maximum in the induced voltage transient of the sensing piezoelectric layer 8 can be used to accurately determine the cantilever tip displacement.

In another aspect of the invention, the PEMS may be incorporated in scanning force microscopes for use in methods of static contact imaging and/or dynamic non-contact imaging. A PEMS may be connected with a direct current (DC) volt meter or a lock-in amplifier allowing the PEMS to record electrical measurements in a DC mode or quasi-static low-frequency-mode. A PEMS is therefore able to detect applied stress between the specimen and microcantilever probe during static contact imaging or tapping contact imaging and determine stiffness and topographical variations of the specimen.

For force measurements, the PEMS generates an induced voltage directly proportional to the force exerted on the PEMS probe. Therefore, by measuring the induced voltage, it is possible to determine the applied force. The prior art, by comparison, was unable to surmount the problems associated with measuring DC induced voltage due to low piezoelectric sensitivity resulting from small $d_{31}$ coefficients, lack of sufficient insulation and lack of sufficient thickness to detect of the peak induced voltage.

Figure 6:
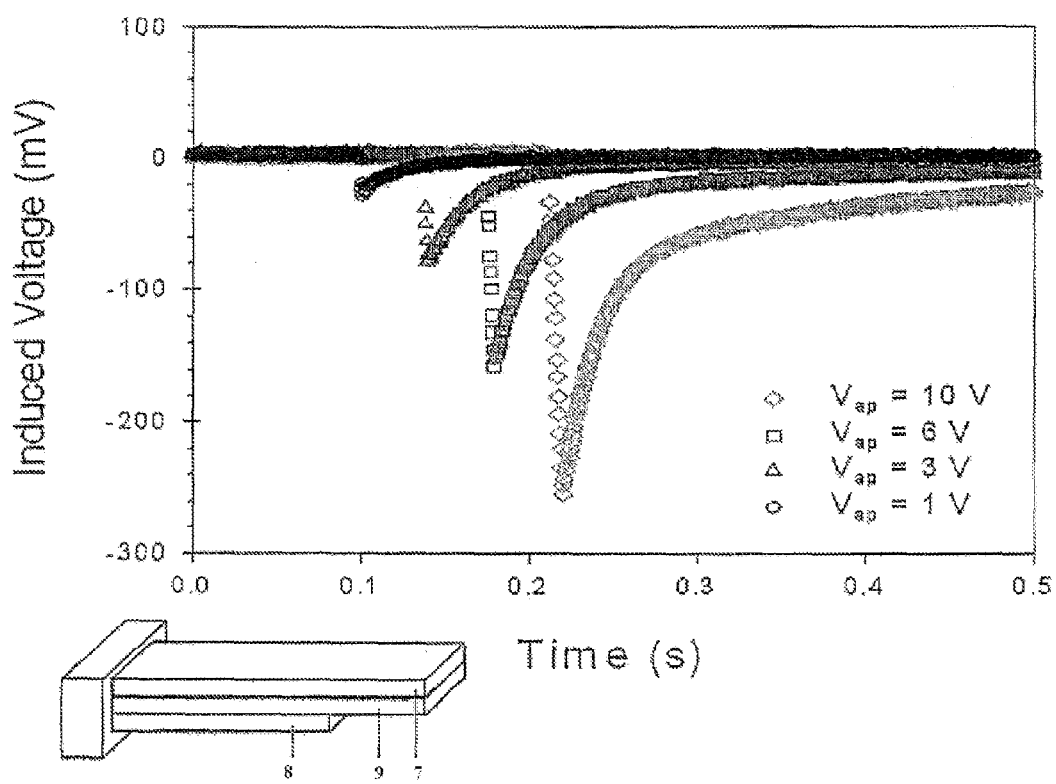
FIG. 6 is a graph of induced piezoelectric voltage at the sensing PZT layer versus time using a PEMS having two piezoelectric layers, depicted in the inset figure.
Figure 7:
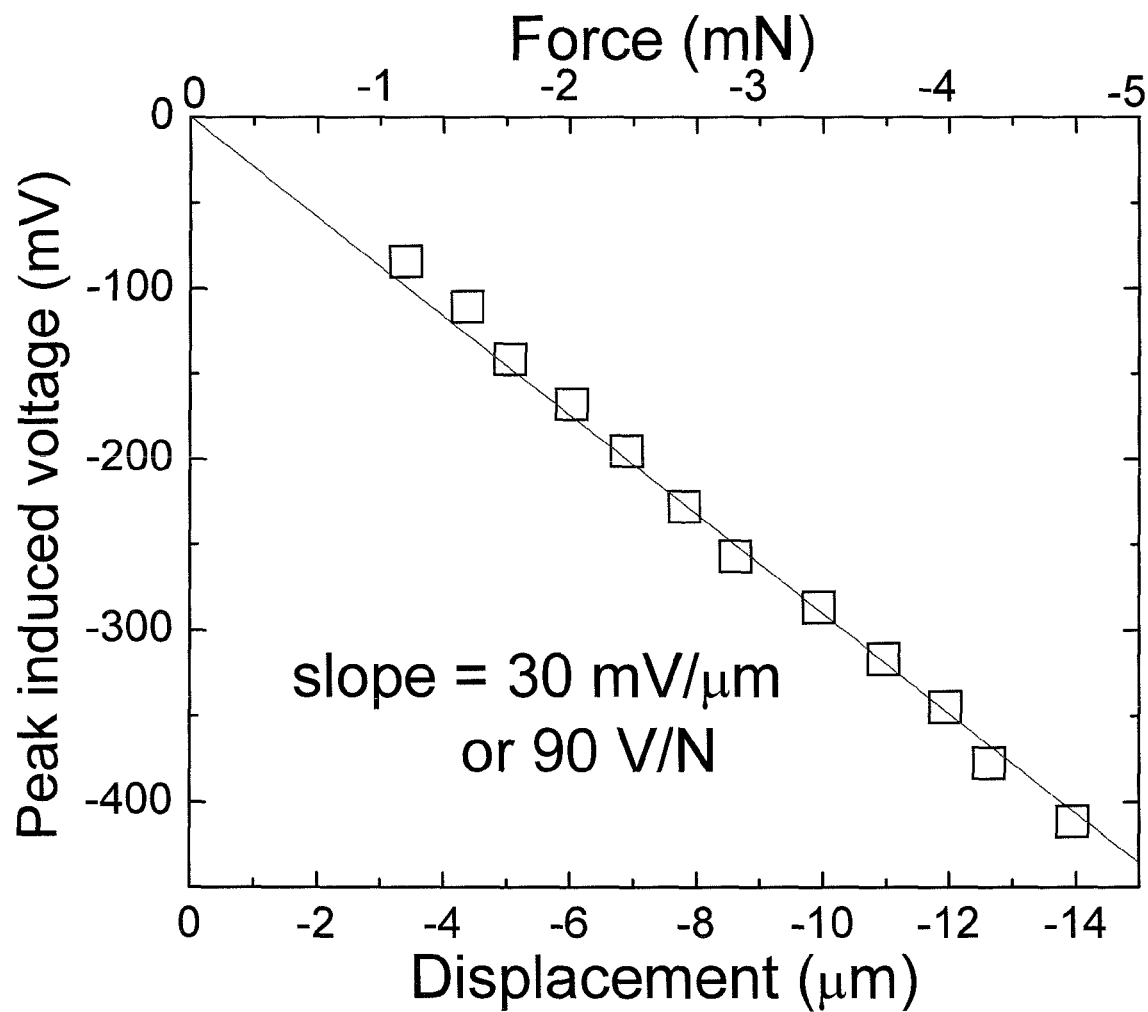
FIG. 7 is a graph of peak induced voltage at the sensing PZT layer versus tip displacement and force.

FIG. 6 illustrates operating an AFM piezoelectric microcantilever in a DC mode. The cantilever comprises a 127 μm thick driving PZT layer 7, a sensing PZT layer of the same thickness 8, a 50 μm thick stainless steel layer 9, as shown in FIG. 6. When a voltage is applied to the driving electrode, the piezoelectric cantilever bends, thereby displacing the tip and inducing a voltage across the sensing PZT layer. The induced voltage is measurable with an oscilloscope. The induced piezoelectric voltage attains a maximum voltage after about $10^{-2}$ sec. Since PZT is not a perfect insulator, the generated charge decays with time. FIG. 7 shows the peak induced voltage versus the tip displacement and the corresponding applied force at the tip, where the force sensitivity of the PZT cantilever was found to be about 90 V/N. FIG. 7 also shows that induced voltage is linearly related to tip displacement and thus the applied force. This relationship is the basis of the all-electrical static force/displacement measurements. In quasi static force/displacement measurements, the low-frequency oscillatory force/displacement produces an oscillatory induced voltage in direct proportion to the force/displacement as similar to the induced voltage versus force/displacement curve shown in FIG. 7.

The AFM PEMS may also operate in an alternating current (AC) mode. An AC electrical impedance may be used to vibrate a microcantilever and detect resonance frequency shifts. This alternating current mode enables the PEMS to operate in a dynamic non-contact mode. In the AC mode, the resonance frequency shifts of the cantilever in response to an oscillating force are monitored and used for detection.

In certain embodiments, the position of the cantilever tip is measured with a piezoelectric sensing element disposed on the cantilever. The piezoelectric sensing element may be electrically connected to external sensing circuitry. The piezoelectric sensing element may be passivated to electrically isolate the piezoelectric sensing element when, for example, a conductive fluid is placed in the internal cavity of the liquid cell used for AFM. The piezoelectric sensing element may be passivated with a material such as silicon nitride, silicon dioxide, parylene, Teflon®, an insulating polymer, or a suitable insulating material. In other embodiments, the position of the cantilever tip is measured with a piezoresistive sensing element or a magnetic sensing element.

In the tapping mode, an excitation voltage generally at or near a resonance frequency of the cantilever is applied to the drive element to tap the cantilever tip against the object. The position of the cantilever tip is measured to determine the local height of the object and the x-y coordinates at the point of measurement. The x-y coordinates may be determined, for example, from the stage position or extracted from scanning voltages applied to the piezotube. The position of the cantilever tip may be measured, for example, with a piezoelectric sensing element, piezo-resistive sensing element or magnetic sensing disposed on the cantilevered probe. In another example, a piezoelectric sensing element and a piezoelectric drive element comprise the same piezoelectric element on the cantilever. In another example, the position of the cantilever tip is measured with a beam of light striking a photodetector after being reflected from at least a portion of the cantilever. Measurements of the cantilever tip position may be used to generate an image of the object.

An image of the object is generated from the measured positions of the cantilever tip when the cantilever tip is scanned across the object. The images may be stored electronically, and may be scaled, enhanced, colored, cropped, stitched or otherwise modified as desired

EXAMPLE 1

Figure 8B:
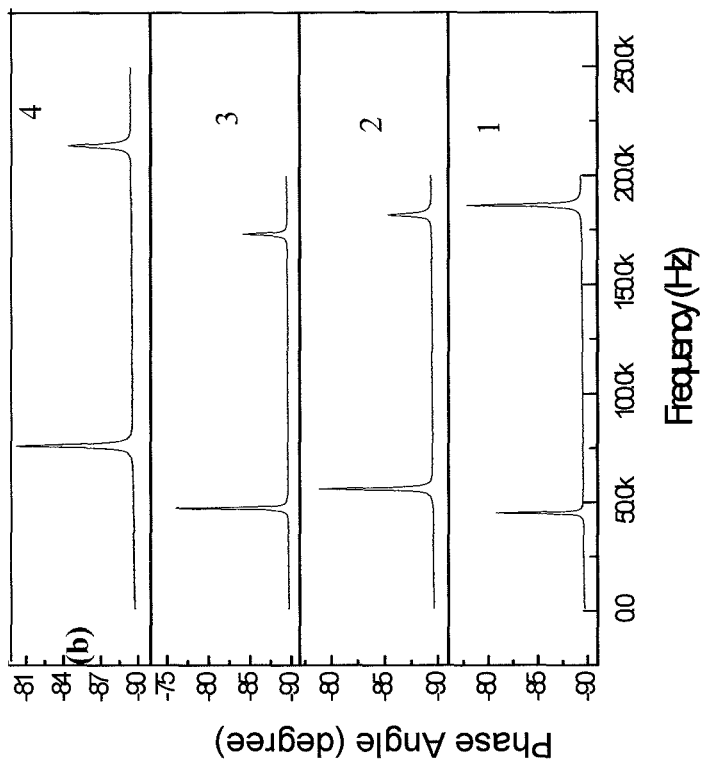
FIG. 8($a$) shows an optical micrograph of a PMN-PT PEMS array having a length of about 500 µm and a width of about 800 µm. The figure shows the non-piezoelectric layer with a copper electrode.
Figure 8A:
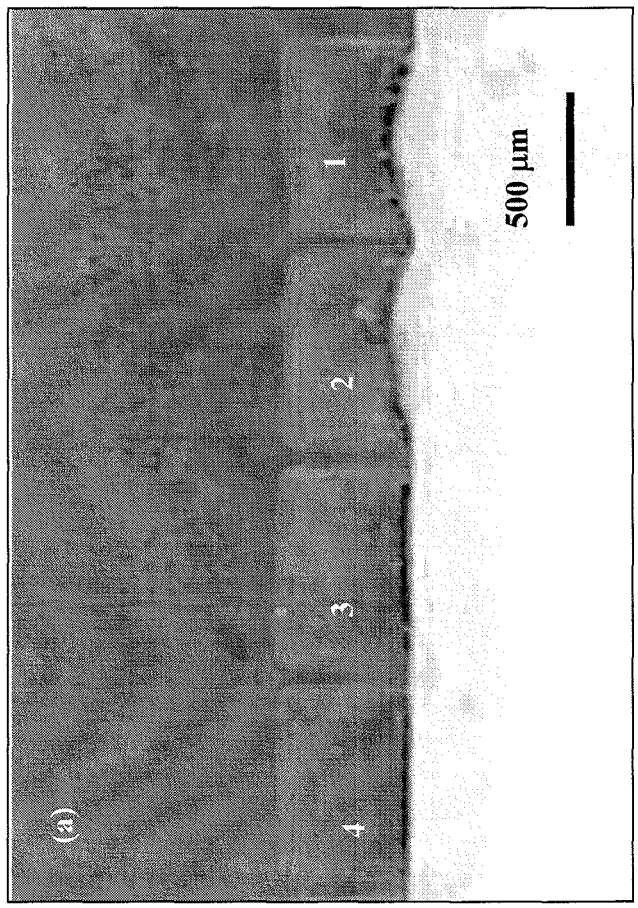

FIG. 8(a) shows a PMN-PT PEMS array microcantilever 500 μm long and 800 μm wide having a resonance spectra depicted in FIG. 8(b).

EXAMPLE 2

A PMNPT/Cu PEMS microcantilever was fabricated having a length of 340 μm, a femtogram sensitivity of $2 \times 10^{-14}$ g/Hz and a Q value as high as 300 where Q is the quality factor and is defined as the ratio of the resonance frequency to the resonance peak width at half the peak height, was constructed from 8 μm thick PMN-PT freestanding films.

EXAMPLE 3

A PMN-PT microcantilever was fabricated smaller than 300 μm in length and 50 μm in width, which affords better than $10^{-15}$ g/Hz sensitivity.

EXAMPLE 4

A $PMN_{0.65}\text{-}PT_{0.35}/Cu$ (PMN-PT/Cu) microcantilever was fabricated having a length of less than 100 μm and a width of less than 100 μm and a thickness of less than 5 μm, capable of providing better than $10^{-16}$ g/Hz detection sensitivity.

EXAMPLE 5

The synthesis of the reactive PMN-PT precursor powder involved two precursor-coated powder suspension (PCPS) steps. The first PCPS step involved suspending $Mg(OH)_2$-coated $Nb_2O_5$ particles in a lead acetate/ethylene glycol solution to obtain the PMN precursor powder. The second PCPS step involved suspending the calcined PMN powder in a PT precursor containing lead acetate and titanium isopropoxide solution in ethylene glycol.

Niobium oxide ($Nb_2O_5$, 99.9%, Aldrich Chemical Company, Inc., Milwaukee, Wis.) was ultrasonically dispersed in distilled water after adding ammonium hydroxide (4.96 N solution in water, Aldrich Chemical Company, Inc., Milwaukee, Wis.). Magnesium nitrate solutions were first prepared by dissolving magnesium nitrate hexahydrate $(Mg(NO_3)_{2.6}H_2O$, 99%, Aldrich Chemical Company, Inc., Milwaukee, Wis.) in distilled water. The magnesium nitrate solution was dropped into the niobium oxide dispersion. Since the pH of the dispersion was between 10 and 11, magnesium hydroxide precipitated and coated on the niobium oxide particles. The final concentration of the $Nb_2O_5$ powder in the coating suspension was 26.6 g/L or 0.1 M.

The $Mg(OH)_2$-coated $Nb_2O_5$ particles were dried subsequently at 150° C. on a hot plate. After drying, the Mg (OH)$_2$-coated $Nb_2O_5$ powder was added to a lead precursor solution where lead acetate anhydrous $(Pb(CH_3COO)_2.2Pb(OH)_2$, Fluka) was dissolved in ethylene glycol ($HOCH_2CH_2OH$, Alfa Aesar) with 15% excess lead. These procedures complete the first PSC step.

The slurry was dried at 150° C. on a hot plate. Pyrochlore-free perovskite PMN powder was obtained by first heating the PMN precursor powder at 1° C./min to 300° C. for 2 hr followed by 5° C./min to 800° C. for 2 hr.

The perovskite PMN powder was then suspended in a PT precursor solution containing lead acetate and titanium isopropoxide $(Ti(OCH(CH_3)_2)_4$, Alfa Aesar) in ethylene glycol (EG) and ball milled for 24 hr. The final nominal composition was $PMN_{0.63}\text{-}PT_{0.37}$ with 10% lead excess. The ball milled PMN-PT precursor slurry was then dried at 200° C. on a hot plate for 2 hr and heated at 1° C./min to 300° C. for 2 hr. After drying at 300° C., low-temperature sinterable PMN-PT powder was obtained and in a form ready for tape casting.

EXAMPLE 6

Tape-casting is a forming technique used to produce thin ceramic (and metallic) layers which are formed on a carrier film by the shearing action of a doctor blade on a moving ceramic slurry. The tape contains a binder system, which serves as a carrier for the ceramic powders; i.e., it holds up the ceramic powders so that they will sinter after the binder is burned out. Some of the desirable properties of the binder system include clean decomposition, good solubility in a wide range of solvents and decent green-strength.

Acrylic resins, such as methyl methacrylate and ethyl methacrylate have long been used in binder systems for ceramic tape casting for their low ash residue upon binder burnout. The use of longer chain alcohol (e.g. alcohols having 4-12 carbon atoms in the chain) esters of methacrylic or acrylic acid yielded much lower decomposition profiles and improved electrical properties. For example, iso-butyl methacrylate, having a molecular weight of 60,000 (Rohm & Haas, Paraloid™ B-38), yields virtually no measurable ash content upon decomposition. This is the result of the use of acrylic acid ester or methacrylic acid ester monomers of four carbon atoms or higher. Other suitable materials include pentyl acrylate, pentyl methacrylate, hexyl acrylate, hexyl methacrylate, heptyl acrylate, heptyl methacrylate, octyl acrylate, octyl methacrylate, nonyl acrylate, nonyl methacrylate, decyl acrylate, decyl methacrylate, undecyl acrylate, undecyl methacrylate, dodecyl acrylate, and dodecyl methacrylate.

Dispersion of the PMN-PT powders is accomplished by a blend of low (about 1,000-10,000) and mid (about 40,000-80,000) molecular weight dispersing resins. A dispersing resin from Rohm and Haas, Paraloid DM-55, with a molecular weight of 6,000, is a blend of methyl methacrylate, isobornyl methacrylate, and proprietary monomers in amounts of 0.1% by weight to 30% by weight, based upon the weight of the ceramic powders. This is blended with an isobutyl methacrylate polymer, with a molecular weight of ~60,000 (Paraloid™ B38 from Rohm and Haas Company) in an amount of 0.1% to 50.0% by weight, based upon weight of the total binder. This dispersion method allows for a higher powder loading, resulting in a denser final part with less shrinkage.

A mill jar was charged with yttria stabilized zirconia media, PMN-PT powder, a dispersing resin blend, and a solvent blend of an alcohol and a ketone; for instance, isopropyl alcohol and methyl ethyl ketone, but could also include various alcohols, ketones, esters, glycol ethers, aliphatic hydrocarbons, and aromatic hydrocarbons. The mill base was ball milled for 16-24 hrs. Then, the balance of the binder/resin was added (1%-50% by weight, based on weight of the ceramic powder), along with a phthalate-based plasticizer (binder: plasticizer ratio of about 2:1 to 3:1); the mixture was then rolled for an additional 24 hrs. The slurry was then de-aerated, and cast into various thicknesses. The green tapes were then punched and prepared for binder removal and sintering.

EXAMPLE 7

A PZT/SiO$_2$ PEMS was configured to have a length of 30 µm and thickness of 2 µm with attogram sensitivity of $10^{-18}$ g/Hz.

EXAMPLE 8

Figures 9A, 9B, 9C:
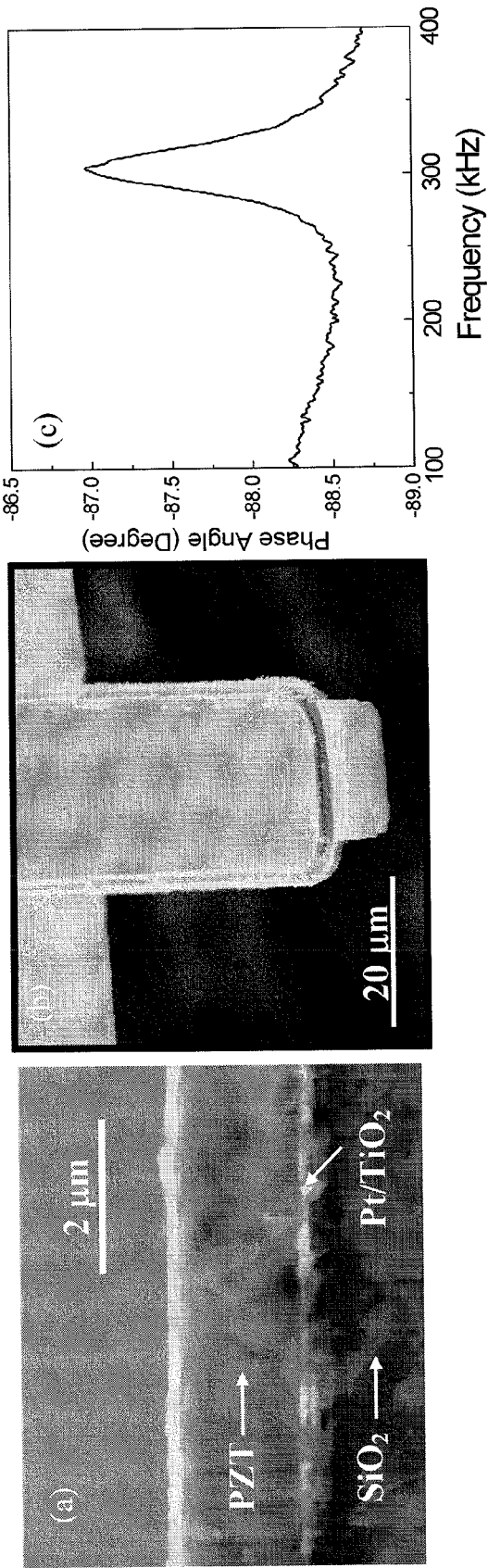
FIG. 9($a$) shows a SEM cross-sectional view of a 1.6 µm thick PZT film.
Figures 10A, 10B, 10C, 10D:
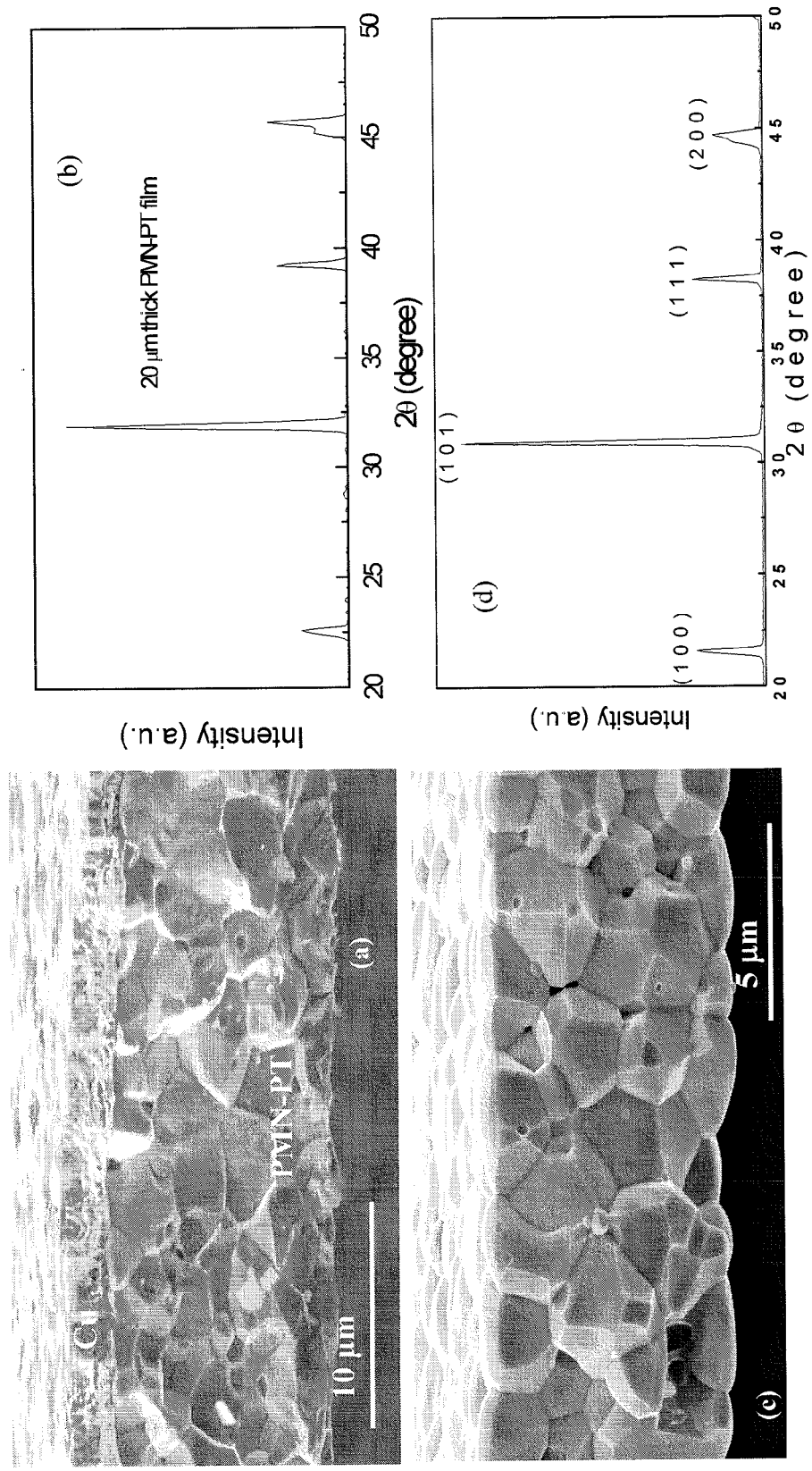
FIG. 10($a$) shows a SEM micrograph of the cross section of 20 µm thick PMN-PT freestanding film plated with 5 µm thick Cu.

A PZT/SiO$_2$ PEMS (FIGS. 9(a) and 9(b)) was configured to have a 50 µm length and resonance frequency spectrum depicted in FIG. 9(c).

EXAMPLE 9

A PEMS was configured to have a length of 60 to 300 µm fabricated from a 1.5-µm thick sol-gel PbZr$_{0.52}$Ti$_{0.48}$O$_3$ (PZT) films that exhibited a 2-µm grain size, a dielectric constant of 1600, and a saturation polarization of 55±5° C./cm$^2$ obtained with an E$_{max}$=600 kV/cm. Resonance spectra show that the PEMS exhibit up to four resonance peaks with quality factors, Q, ranging from 120 to 320.

EXAMPLE 10

FIGS. 10(a)-10(d) show SEM micrographs and the XRD patterns for freestanding single-phase PMN-PT films having a thickness of 22 µm and 8 µm. The grains in the SEM micrographs were well faceted, indicating that the films were fully dense. The X-ray patterns indicated that films are single-phase perovskite PMN-PT. These freestanding PMN-PT films have a dielectric constant greater than 1000, a saturated polarization of about 30 µC/cm$^2$, a remnant polarization of 25 µC/cm$^2$ and a Q value as high as 300, where Q is defined as the ratio of the resonance frequency to the resonance peak width at half the peak height.

Figure 2B:
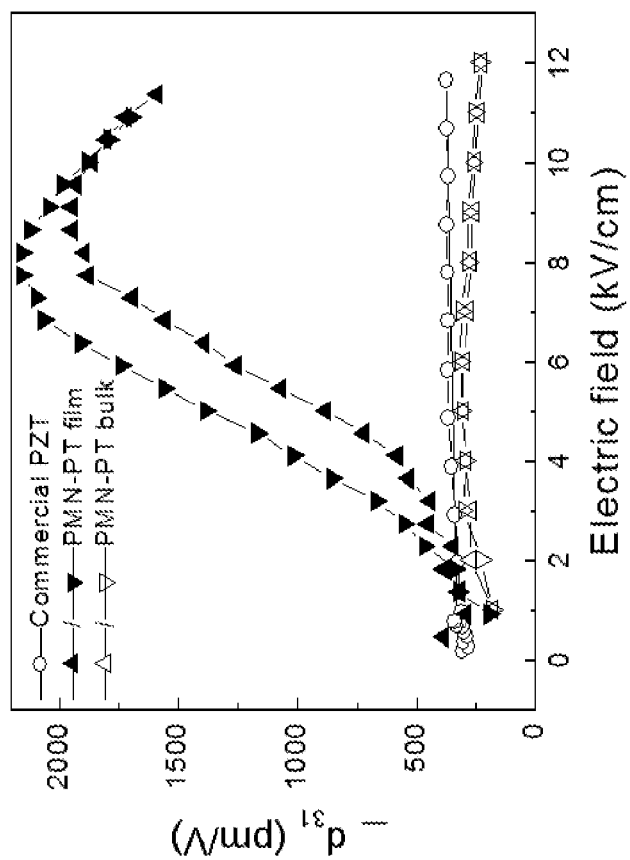

The 8 µm and 22 µm thick PMN-PT freestanding films were electroplated with 4 and 5 µm thick copper layers, respectively. After attaching the wires to the top and bottom electrodes using conductive glue, the PMN-PT/Cu strips were finally glued to a glass substrate to form the microcantilevers. Note that because the cantilevers thus fabricated had very clean interfaces between the PMN-PT layer and the electrodes. As a result, the cantilevers exhibited very high Q values (above 300) as shown in the blow-up resonance spectrum of a microcantilever with a 22 µm thick PMN-PT layer and a 5 µm thick Cu layer in FIG. 2(b), which is larger than that of commercial PZT (See the Q values of FIG. 4(a)).

EXAMPLE 11

Using a sol-gel procedure with ethylene glycol as solvent, one could achieve 1.5 µm thick fully-dense PZT films that exhibited an average grain size of 2 µm, a dielectric constant of 1600, and a saturation polarization of 55±5° C./cm$^2$ with a maximum applied electric field, E$_{max}$=600 kV/cm, better than the typical dielectric constant (800-1000) and saturation polarization (20-40° C./cm$^2$) of most PZT films.

EXAMPLE 12

A PZT/SiO$_2$ PEMS is fabricated having dimensions as small as 60 µm in length with a 24×20 µm SiO$_2$ extension at the free end using PZT films obtained using a sol-gel procedure.

Figures 11A, 11B, 11C:
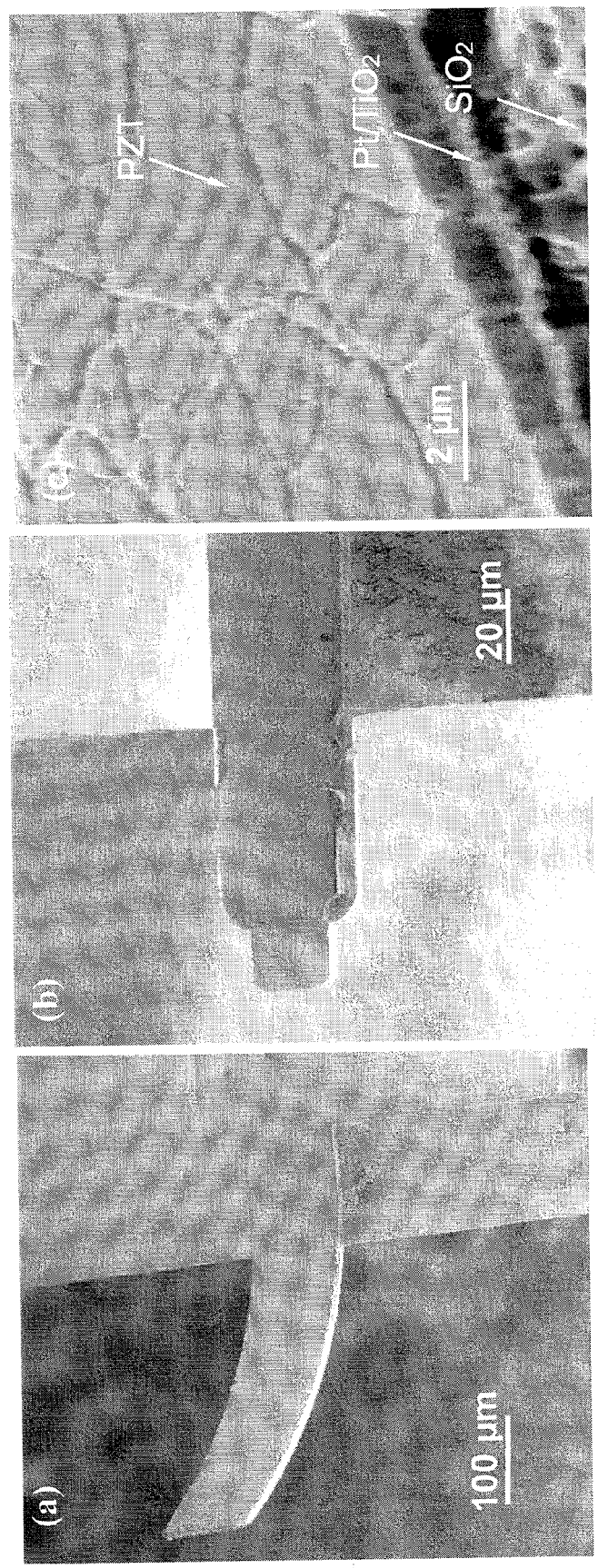
FIG. 11($a$) shows a SEM micrograph of a 300×70 µm PZT/SiO$_2$ PEMS (PEMS-1).

The PEMS was constructed by depositing a 2-µm thick low-stress SiO$_2$ layer on a 3-in silicon wafer by steam oxidation at 850° C. A 1500 Å-thick platinum bottom electrode with a 400 Å thick TiO$_2$ bonding layer was then deposited on the SiO$_2$ layer. On the Pt/TiO$_2$/SiO$_2$/Si substrate, a 1.5-µm thick PZT layer was deposited using the sol-gel method with repeated spin coating and heat treatment. A 400 Å titanium, followed by 1000 Å thick platinum and 5000 Å thick nickel, was then deposited on the PZT layer by E-gun evaporation and patterned using a photolithographic lift-off process. The nickel layer was used as a hard mask in the dry etching process. The PZT layer and the TiO$_2$/Pt bottom electrode were patterned by inductively coupled plasma (ICP) dry etching. The underside of the silicon wafer was removed by backside KOH wet etching. Finally, the SiO$_2$ membrane was etched by reactive ion etching (RIE) to release the PEMS. All PEMS had a 1.5 µm thick PZT layer and a 2.0 µm thick SiO$_2$ layer (both in the PZT/SiO$_2$ section and in the SO$_2$ extension section). FIGS. 11(a) and 11(b) respectively show the scanning electron microscopy (SEM) micrograph of a 300×70 µm PZT/SiO$_2$ PEMS (PEMS-1) and that of a 60×25 µm PZT/SiO$_2$ PEMS with a 24×20 µm SiO$_2$ extension (PEMS-2). The PZT layer is shown to be dense with a smooth surface. FIG. 11(c) shows a SEM micrograph of an ICP-etched PZT surface revealing that the PZT layer had an average grain size of about 2 µm, larger than the PZT thickness, indicating that the PZT layer is well-sintered, consistent with the earlier results finding that the PZT film could withstand an electric field of 600 kV/cm.

Figures 12A, 12B:
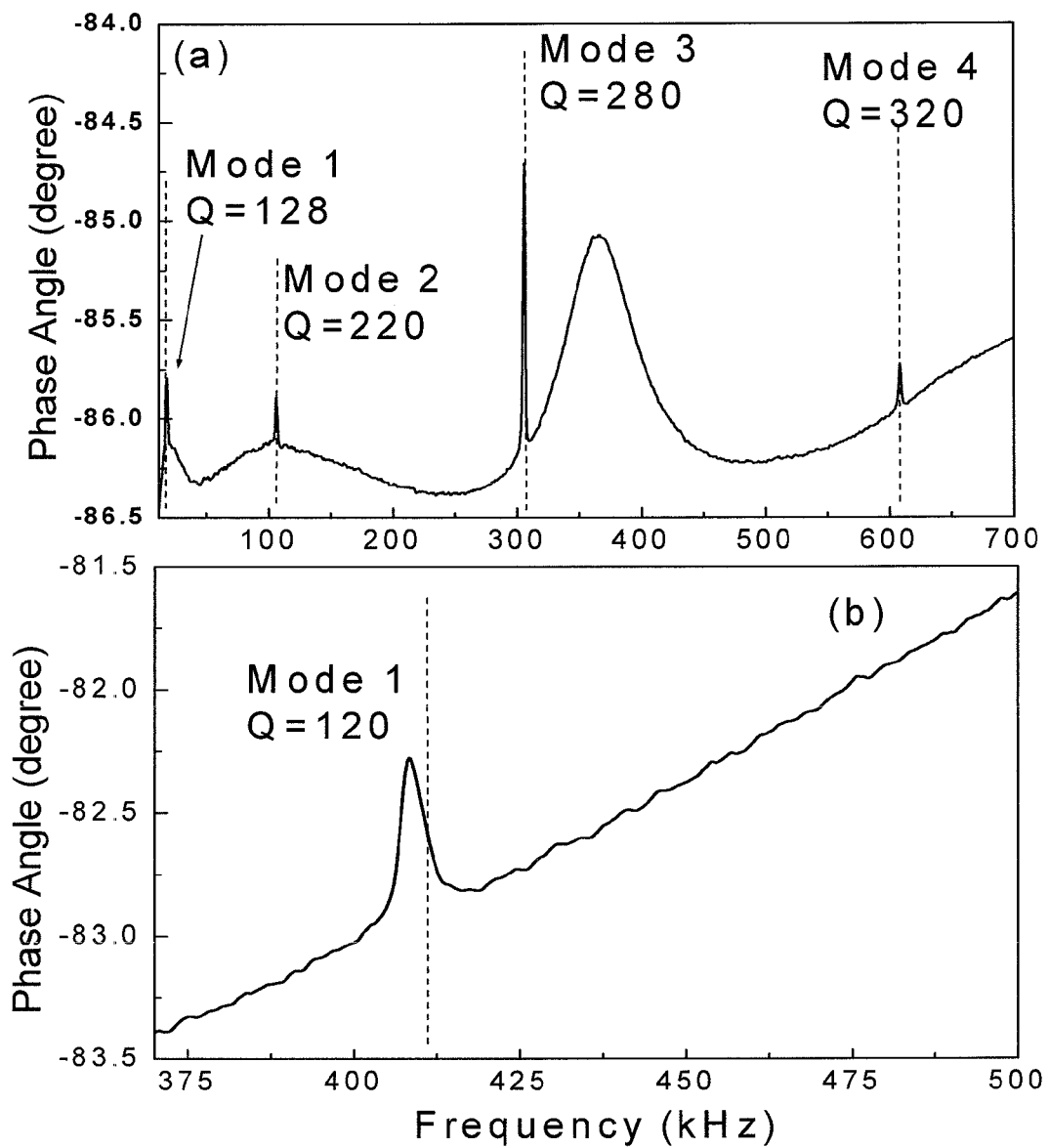
FIG. 12($a$) shows the resonance frequency spectra of PEMS-1.

Both PEMS-1 and PEMS-2 exhibited a relative dielectric constant of 1500 at 10 kHz, consistent with the measurement of 1600 taken prior to micro-fabrication, indicating that minimizes any damage to the PZT layer. The PEMS were "poled" at room temperature by a DC bias voltage of 15V (100 kV/cm) in the impedance spectrum scan. Initially the spectrum exhibited no peak, gradually resonance peaks appeared with both an increasing intensity and peak frequency. After 30 min, the PEMS became "poled" in that the PEMS started to exhibit resonance peaks even without a DC bias and the resonance peak height and peak frequency became stable with time for any DC bias voltage ranging 0-15V. The resonance frequency spectra of PEMS-1 and PEMS-2 obtained with a 15V DC bias voltage and a 500mV ac voltage are shown in FIGS. 12(a) and 12(b), respectively. As can be seen from FIG. 12(a), PEMS-1 exhibited four resonance peaks at 17.9, 106.2, 305.7, and 608.6 kHz, corresponding to the first four flexural vibration modes. The first four flexural resonance frequencies, calculated using a method for PEMS of uniform thickness, were 17.8, 110.4, 307.9, and 612.3 kHz, marked by the vertical dashed lines in FIGS. 12(a) and 12(b) are in agreement with the experimental resonance peaks. For PEMS-2, only the first peak at 408 kHz, shown in FIG. 12(b), was in agreement with the theoretical first-peak resonance frequency of 412 kHz, calculated using a model for a two-sectioned PEMS and marked by the vertical dashed line. It is worth noting that all the resonance peaks exhibited high quality factors, Q, ranging from 120 to 320, where Q was defined as the ratio of the resonance frequency relative to the resonance peak width at half the peak height.

EXAMPLE 13

Figures 13A, 13B:
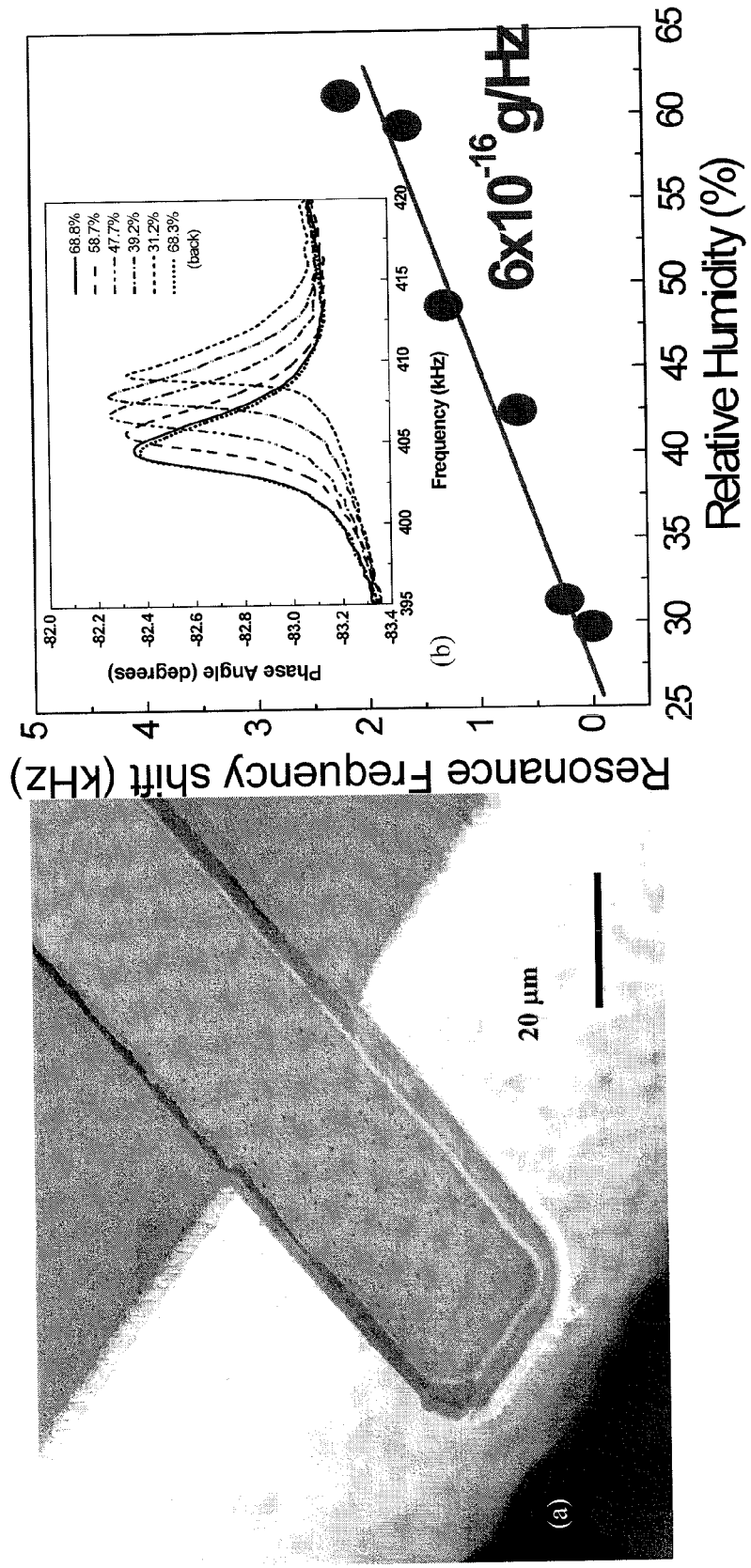
FIG. 13($a$) is an SEM micrograph a 40 µm long PZT/SiO$_2$ PEMS.

The 40 µm long PZT/SiO$_2$ PEMS of FIG. 13(a) was found to have a sensitivity of about $10^{-16}$ g/Hz with resonance peaks Q values as high as 300 in a humidity controlled environment. FIG. 13(b) shows the resonance frequency spectra of the PEMS corresponding to varying humidity. The resonance frequency was found to decrease with an increasing relative humidity due to the adsorption of water molecules on the sensor surface.

The resultant sensitivity of $6 \times 10^{-16}$ g/Hz demonstrates the feasibility of further reducing PEMS size while increasing sensitivity when compared to the millimeter sized commercial PZT PEMS having a sensitivity of about $10^{-11}$ g/Hz and 300-800 μm long PMN-PT PEMS having a sensitivity of about $10^{-13}$ to $10^{-14}$ g/Hz of the prior art.

Having described the preferred embodiments of the invention which are intended to be illustrative and not limiting, it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, the intended scope of protection is set forth in the appended claims.

EXAMPLE 14

To enable in-solution sensing, a piezoelectric microcantilever may be coated with an insulation layer. Mercaptopropylsilane (MPTS) was investigated for its electrical insulation and receptor immobilization characteristics. The results established that MPTS is an effective insulator enabling detection in solution as well as an effective receptor immobilization coating.

To prepare the MPTS coated PEMS, a PMN-PT/tin PEMS was first soaked in a diluted (1:100 in water) piranha solution, containing two parts of 98% sulfuric acid and one part of 30% hydrogen peroxide, at 20° C. for 1 minute to clean the tin and gold surfaces. Next, the PEMS was submerged in a beaker containing a 40 mM solution of MPTS in ethanol, and the beaker was covered with paraffin film to prevent ethanol evaporation. After 4 hours, the PEMS was rinsed with deionized (DI) water and submerged in a 0.01 M solution of NaOH overnight for cross-linking. The PEMS was then soaked in DI water for 1 hour and dried overnight in a vacuum-oven at 762 mm Hg to ensure that all the water was removed. The PEMS was then submerged in a 1 volume percent solution of MPTS in ethanol titrated to pH 4.5 with acetic acid. The solution was covered with paraffin film to prevent ethanol evaporation, and the PEMS was allowed to soak for 8 hours. The PEMS was again soaked in DI water for 1 hour and dried overnight in a vacuum-oven at 762 mm Hg.

EXAMPLE 15

There exist a number of means for immobilizing various receptors on different electrode surfaces. The immobilization methods may differ depending upon the receptor to be bound on the electrode surface.

For example, BA antigens may be immobilized on a lead surface by cleaning a platinum electrode with a 1:40 diluted piranha solution for 2 minutes, soaking the PEMS in a 2 mM 3-mercaptopropionic acid (MPA) for 2 hours to form an MPA monolayer on the electrode surface, and activating the carboxyl group of the MPA using a solution of 2 mM N-Ethyl-N'-(3-dimethylaminopropyl)carbodiimide (EDC) and 5 mM N-hydroxysuccinimide (NHS) in water to allow covalent bonding of primary amines on the anti-BA-spore antibody to the MPA monolayer.

EXAMPLE 16

A method for PSA receptor immobilization on a lead surface includes the steps of immersing the microcantilever in a solution containing 1 part 30% $H_2O_2$, concentrated $H_2SO_4$ and 29 parts water for 2 minutes, rinsing with distilled water and immersing in a 1 mM MPA aqueous solution overnight. The microcantilever tip is then rinsed with distilled water and activated by immersion in a solution containing 5 mg/ml 1-ethyl-3-(3-dimethylaminopropy)carbodiimide hydrochloride (EDC), 5mg/ml N-hydroxysulfosuccinimide (NHS) and distilled water for 30 minutes. 1 μl of a 0.1 mg/ml solution containing anti-PSA in PBS at a pH of 7.4 was then coated on the cantilever surface over a period of 30 minutes.

EXAMPLE 17 scFv receptors may be immobilized on a gold surface by binding activated MPA to the amine groups of lysine in the scFv. The immobilization method includes the steps of coating MPA on the gold-coated cantilever tip, activating the MPA with a solution of 5 mg/ml 1-ethyl-3-(3-dimethylaminopropy)carbodiimide hydrochloride (EDC), 5 mg/ml N-hydroxysulfosuccinimide (NHS) and distilled water for 30 minutes and partially immersing the microcantilever in the scFv solution. Alternatively, mercaptoundecanoic acid (MUA) may be used in order to optimize the efficiency.

EXAMPLE 18 scFv receptors may also be immobilized on a gold surface by using $Cu^{2+}$ ions to bind to the His6 tag of scFv. In this method, the gold coated microcantilever tip is first cleaned with Piranha solution for 10 minutes and rinsed with distilled water. The gold surface is then treated with MPTS, MPA (mercaptopropionic acid), or MUA (mercaptoundecanoic acid) to form a monolayer on the gold-coated sensor surface. Preferably, the gold surface is treated by immersion in a solution of 1 mM 11 mercaptoundecanoic acid (MUA) and ethanol for 3 hours and rinsed with distilled water. The cantilever is then immersed in a 2mM $Cu(ClO_4)_2$ aqueous solution for 10 minutes to adsorb $Cu^{2+}$ on the MUA self assembled monolayer and form a MPA-Cu composite monolayer. A monolayer of Cu ions will bind to the His6 tag at the C-terminal of scFv. The cantilever may then be partially immersed in the scFv solution for in-situ monitoring of the binding of the scFv to the $Cu^{2+}$ ions on the cantilever tip surface.

EXAMPLE 19

Another method for immobilization of scFv on a $SiO_2$ surface entails cleaning an electrode surface using a strong acid and reacting the surface with glycidoxypropyl trimethoxysilane (GOPTS) to generate epoxy groups. The surface is then reacted with amine groups of lysine in the scFv. Alternatively, other other bifunctional linkers such as alkoxysilane-PEG-carboxyl may be used on the $SiO_2$ surface. The electrode surface is then treated with $Cu(ClO_4)_2$~$6H_2O$ or $CuCl_2$ to create $Cu^{2+}$ ions on the surface that bind the His6 tag or cysteine tag at the c-terminal of the scFv. The length of the PEG may be varied to obtain optimal antigen-receptor binding.

Having described the preferred embodiments of the invention which are intended to be illustrative and not limiting, it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, the intended scope of protection is set forth in the appended claims.

EXAMPLE 20

Figure 14:
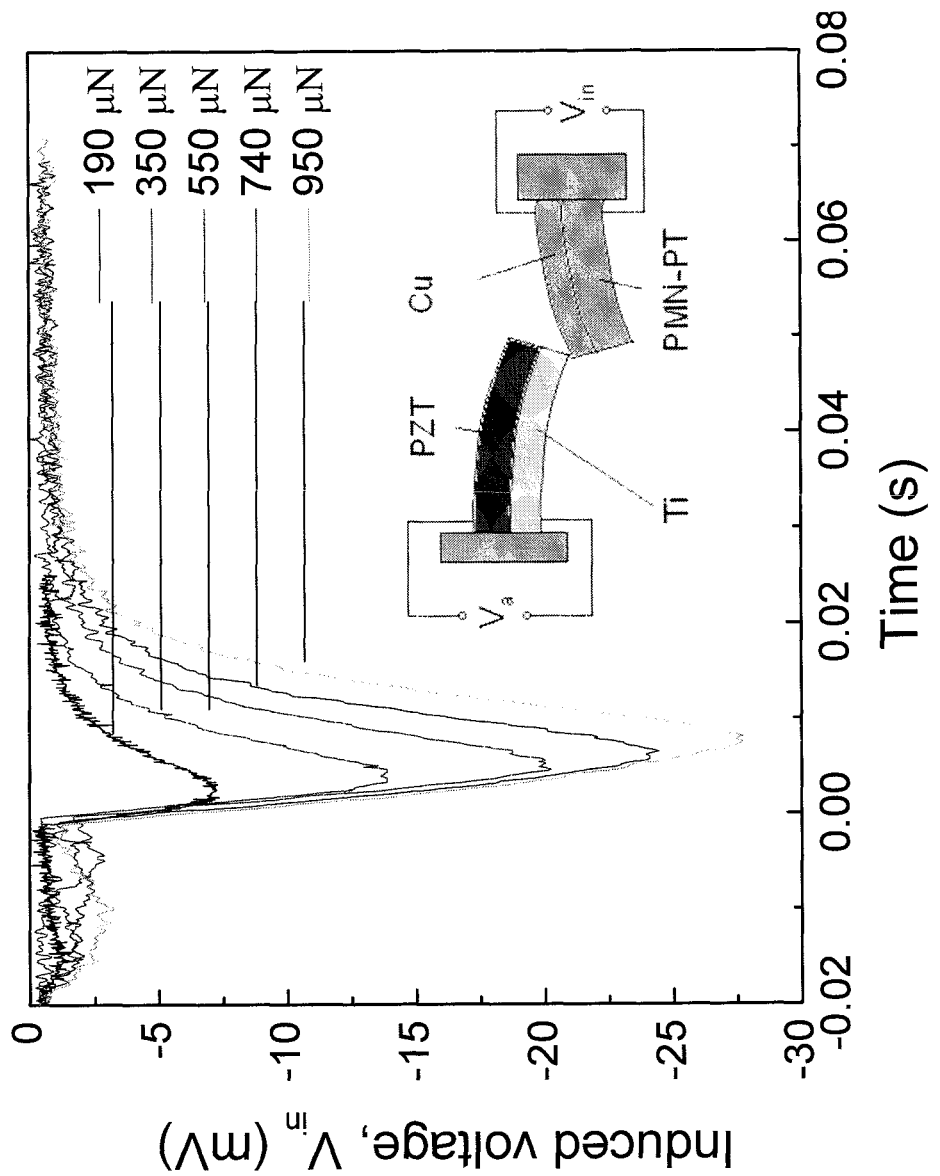
FIG. 14 is a graph of induced voltage of the PMN-PT/Cu cantilever as a function of time.
Figure 15:
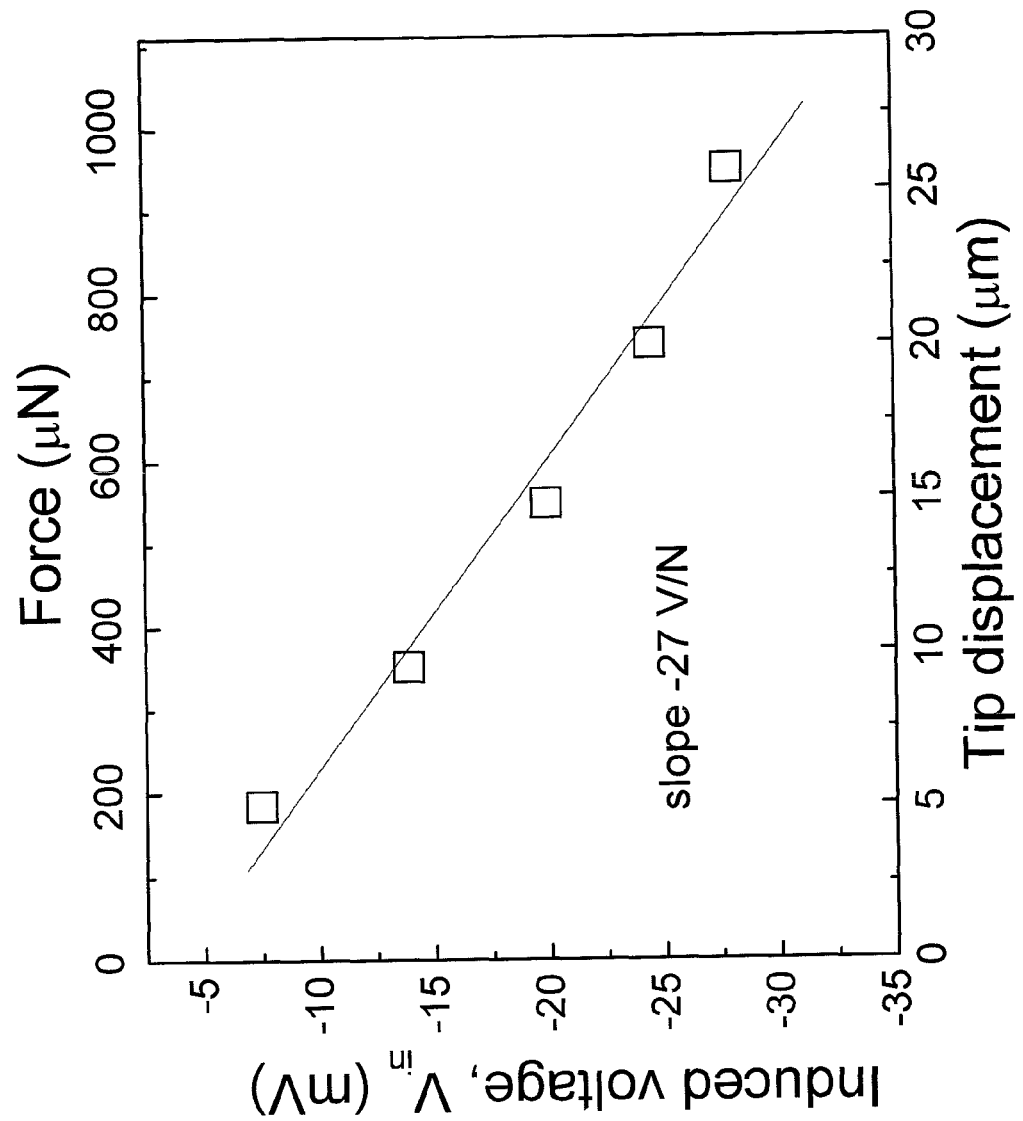
FIG. 15 is a graph of the peak induced voltage of the PMN-PT cantilever as a function of tip displacement and force exerted by the PZT/Ti cantilever.

PMN-PT/Cu cantilevers were also evaluated to determine their capability for force detection. The induced voltage of a 1.9 mm long and 1 mm wide PMNPT/Cu cantilever consisting of a 40-μm-thick PMN-PT layer bonded with a 30 μm-thick Cu layer was measured. As shown in the inset of FIG. 14, a PZT/Ti cantilever force applicator was used to exert the force. FIG. 14 also shows the induced voltage of the PMNPT/Cu cantilever generated by the PZT/Ti cantilever force applicator at various applied voltages as a function of time. The figure shows that the voltage induced by the static axial force rose within $10^{-2}$ seconds to its peak value. The voltage then decayed exponentially with time due to the fact that the PMN-PT was not perfectly insulating. FIG. 15 shows the peak induced voltage of the PMN-PT cantilever as a function of tip displacement and force exerted by the PZT/Ti cantilever. From the slope of FIG. 15, the voltage generation capability of the PMN-PT PEMS was determined to be about 27 V/N.

EXAMPLE 21 AND COMPARATIVE EXAMPLE A

In an exemplary embodiment, the method of the present invention may be used to fabricate lead-free Sb—NKNLN free standing films. A precursor solution was first formulated by dissolving $NaNO_3$ (Alfa Aesar, 99%) and $KNO_3$ (Alfa Aesar, 99%) in about 200 ml of ethylene glycol at about 90° C. and subsequently adding lithium-2,4-pentanedionate (Alfa Aesar, 98%) to produce a clear solution. Next, the $Nb_2O_5$ particles (Alfa Aesar, 99.9%) and $Sb_2O_5$ particles (Alfa Aesar, 99.998%) were added to the precursor solution, resulting in a 0.5 M concentration. The suspension was then ultrasonicated for about 5 minutes to break up the $Nb_2O_5$ and $Sb_2O_5$ agglomerates and then dried to obtain the precursor-coated $Nb_2O_5$ and $Sb_2O_5$ lead-free powder mixture.

After calcination at about 850° C. for about 2 hours, the powder was ball-milled for about 24 hours and sieved using #45 and #100 meshes for better packing. The powder was then mixed with a proprietary dispersing resin and ball milled in an alcohol-ketone mixture for about 24 hours. With the remaining resin and a phthalate-based plasticizer, the precursor powder was further ball-milled for about 24 hours, de-aired, cast to the desired thickness, and sintered at about 1100-1120° C. for about 2 hours. Sintering was carried out in alumina crucibles sealed by a packing powder having the same composition as that of the film.

The fabricated lead-free Sb—NKNLN free standing film was then configured to form a microcantilever sensor and an electric-field was applied to the sensor. The determination of the piezoelectric coefficient $-d_{31}$ of the Sb—NKNLN film was carried out using two different methods: (1) direct measurement, wherein the lateral displacement of the piezoelectric strip was measured under an applied electric field, i.e. the converse piezoelectric effect, and (2) cantilever bending measurement, wherein the tip displacement of a cantilever consisting of the piezoelectric film bonded to a non-piezoelectric layer such as copper, was measured under an applied electric field. In both measurement methods, a laser displacement meter (Keyence, model LC2450) was used to acquire the displacements. For method (1), both sides of the cantilever were sputtered with a Pt electrode. A small piece of 0.002-inch thick titanium foil was attached to the tip of the cantilever as a mirror for the laser to focus on. For method (2), one side of the cantilever was sputtered with Pt and the other side was electroplated with copper as a non-piezoelectric layer to induce bending upon the application of electric field. The laser beam was directly focused on the cantilever surface at the tip.

The strain was determined by measuring the lateral displacement of a Sb-doped NKN-LN strip having a thickness of about 40 μm and a Sb-doped NKN-LN bulk bar having a thickness of about 550 μm under an applied electric field. The $-d_{31}$ coefficient values were deduced by dividing the measured strain by the applied electric field.

Figure 16A:
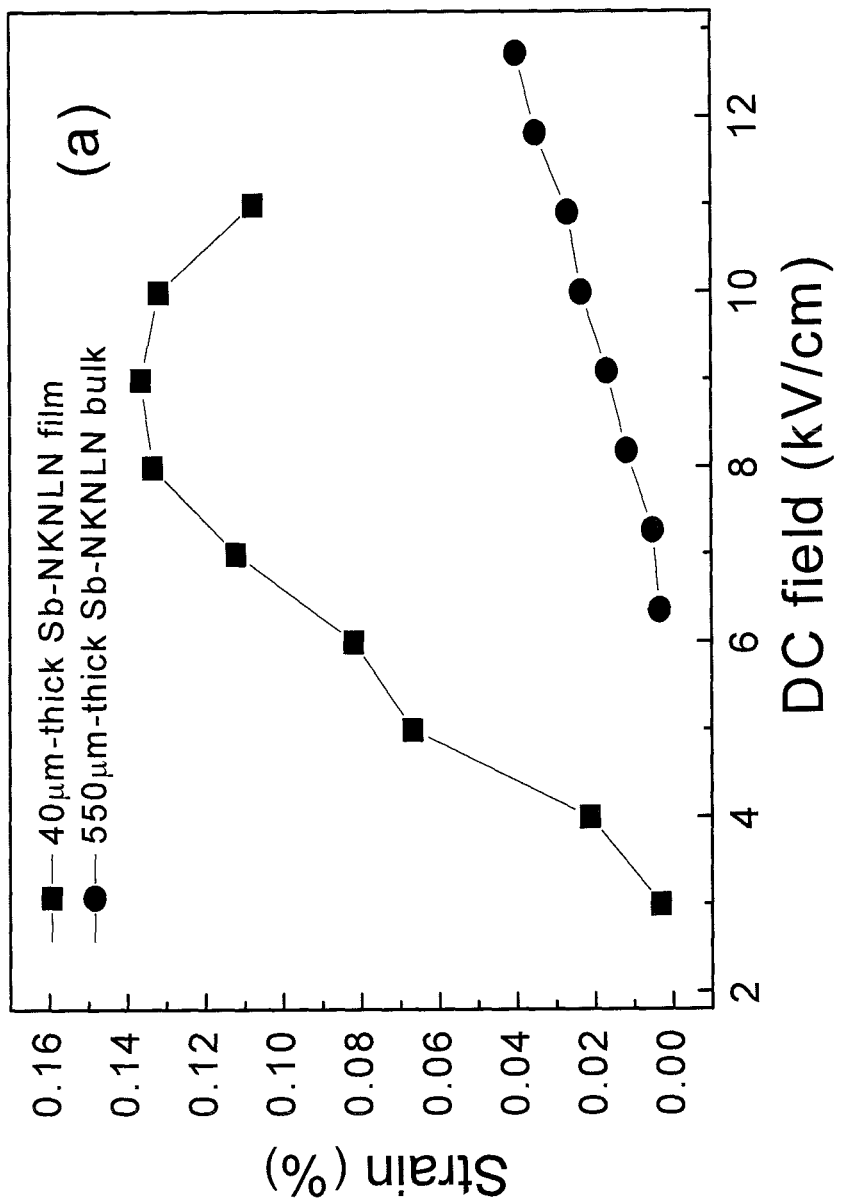
FIG. 16($a$) is a graph of strain as a function of electric field for a Sb—NKNLN free-standing film and a bulk Sb—NKNLN.
Figure 16B:
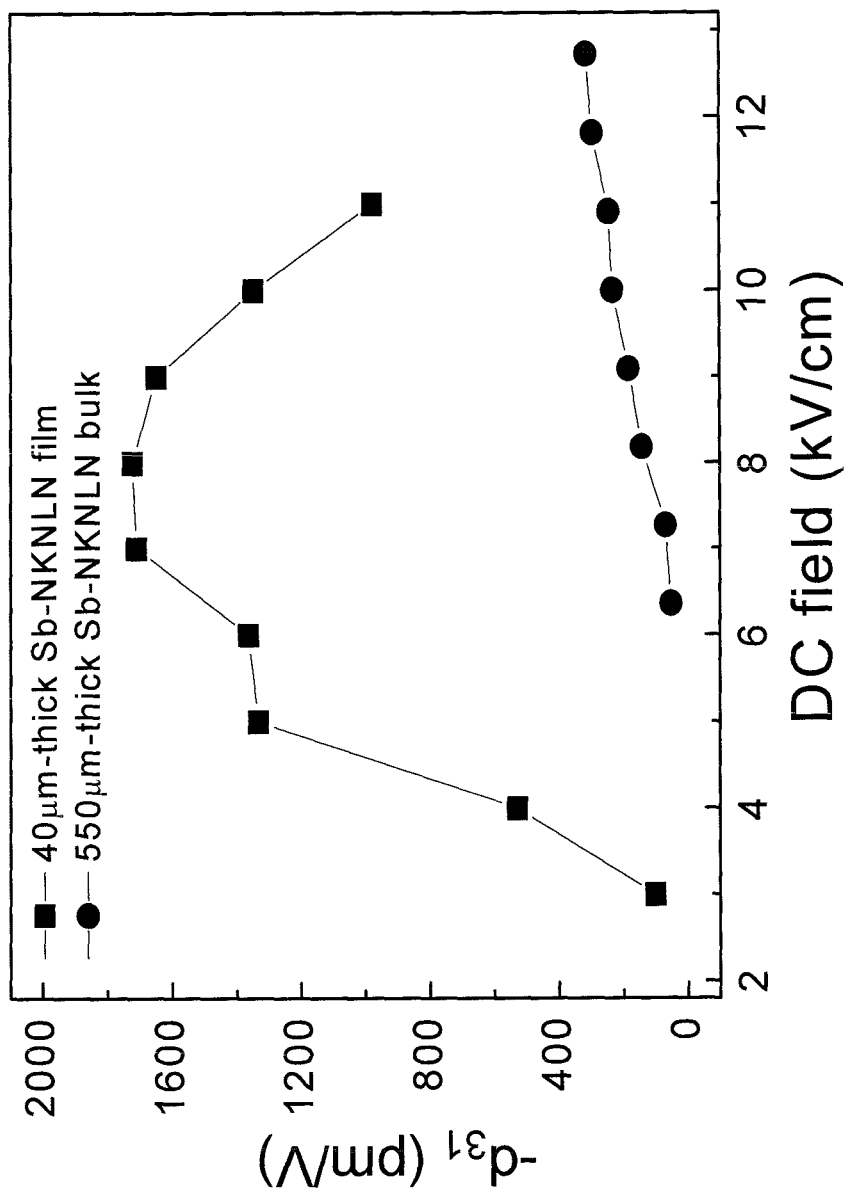

As shown in FIG. 16, a DC electric field increased the strains and $-d_{31}$ values of both the Sb-doped NKN-LN film and the Sb-doped NKN-LN bulk bar. However, the free standing film showed a much larger strain increase to a much higher value than the bulk bar, resulting in about 10-fold to 20-fold increase in the $-d_{31}$ value. The Sb—NKNLN bulk materials produced $-d_{31}$ values ranging from 82 to 116 pm/V (See H. Li, et al., "Effect of Antimony Concentration on the Crystalline Structure, Dielectric and Piezoelectric Properties of $(Na_{0.5}K_{0.5})_{0.945}Li_{0.055}Nb_{1-x}Sb_xO_3$ Solid Solutions", *J. Am. Ceram. Soc.*, 90, 3070 (2007); and S. Zhang, et al., "Piezoelectric Properties in Perovskite $0.948(K_{0.5}Na_{0.5})NbO_3$-$0.052LiSbO_3$ lead-free ceramics", *J. App. Phys.*, 100, 104108 (2006)). The determined $-d_{31}$ value induced at a low electrical field of about 6 to about 8 kV/cm agreed with the reported values.

Figure 17:
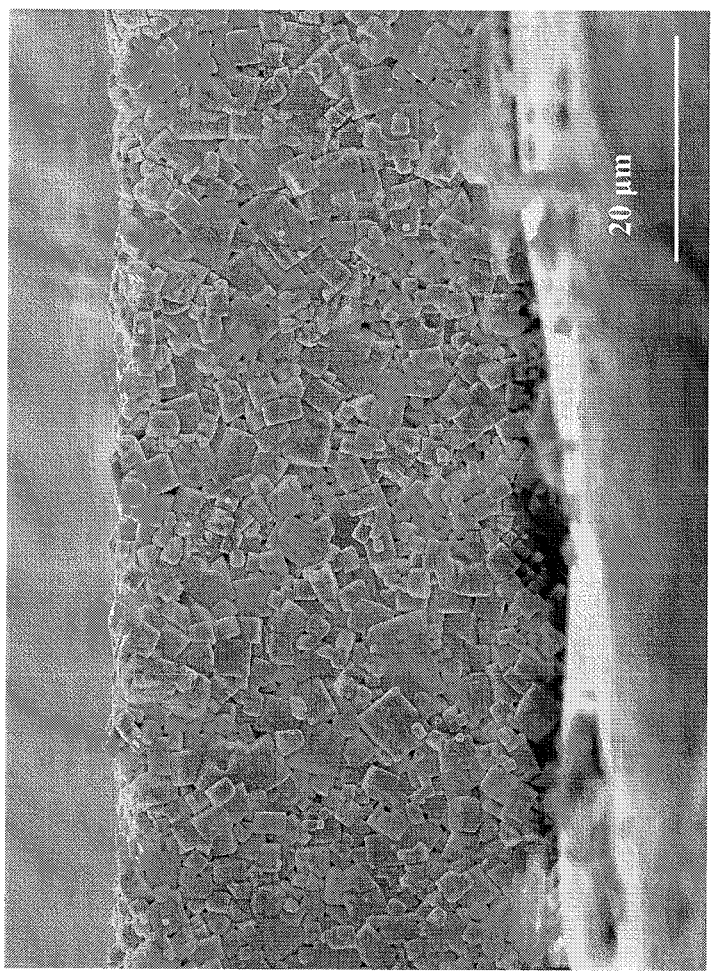
FIG. 17 is an ESEM photograph of a cross-section of a 40-µm-thick Sb—NKNLN free-standing film.

FIG. 17 shows an ESEM photograph of a cross-section of a Sb—NKNLN free-standing film having a thickness of about 40-μm. The film is fully dense and there are only about 10 to 20 grains across the thickness direction of the film.

Figure 18:
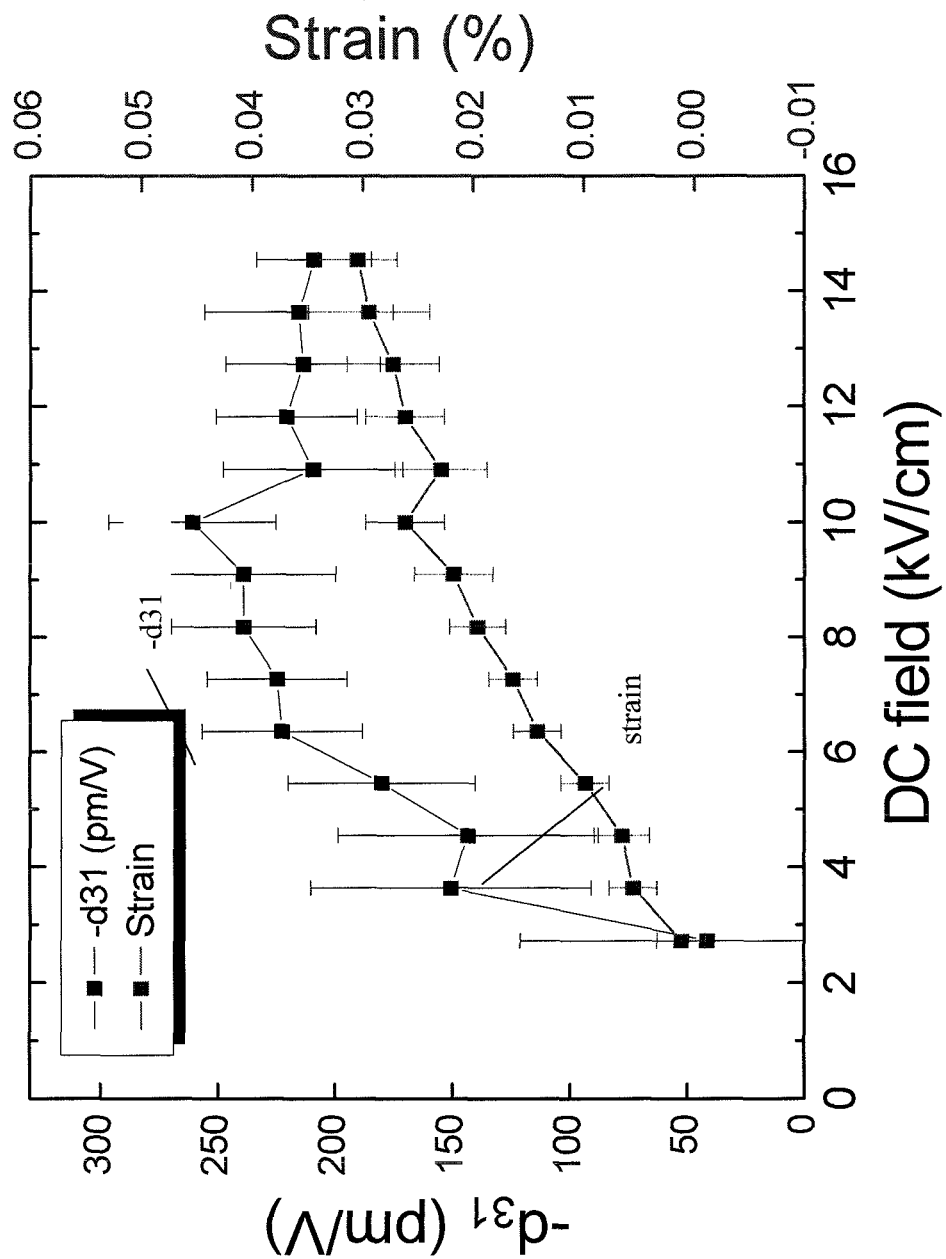
FIG. 18 is a graph of the strain and dielectric coefficient $-d_{31}$ of an undoped NKN free-standing strip as a function of an applied electric field.

Direct measurement of $-d_{31}$ was also performed on undoped NKN to verify the electric-field enhancement of the free standing film geometry. FIG. 18 shows the behavior of the lateral strain and the determined $-d_{31}$ value of an undoped NKN free standing strip having a thickness of about 60 μm under an applied electric field. When the electric field was lower than about 3 kV/cm, the lateral displacement of the strip was smaller than the resolution of the laser displacement meter. Thus, no reading was obtained at those fields. At about 3 kV/cm, a determined $-d_{31}$ value of about 41 μm/V was obtained, consistent with the reported $-d_{31}$ value of undoped NKN at a field of about 32 pm/V to about 49 pm/V. Similar to the behavior of Sb—NKNLN free standing films, as the electric field increased, the $-d_{31}$ increased and reached a maximum of about 250 pm/V at about 10 kV/cm, which represents about a 5-fold increase compared to the value of the bulk bar.

Figure 19:
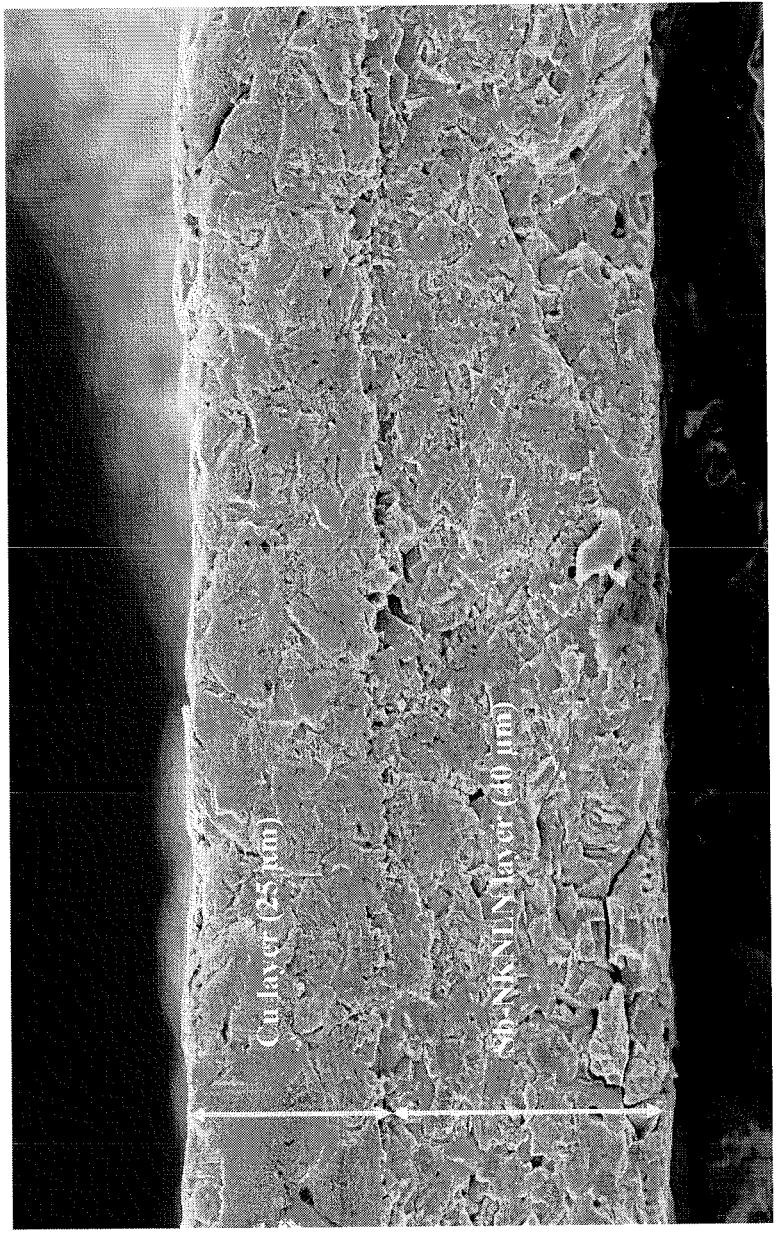
FIG. 19 is ESEM photograph of the cross-section of Sb—NKNLN cantilever with a Cu layer.

The $-d_{31}$ value of the Sb—NKNLN film was also measured by bonding the free-standing films to a non-piezoelectric layer forming a cantilever and performing a cantilever bending measurement. The cantilevers used for this measurement were about 3 mm to about 4 mm long and about 0.5 mm to about -0.7 mm wide. One side of the cantilever was provided with Pt-electrode and the other side was electroplated with Cu. The thickness of the Sb—NKNLN material in the cantilever was about 40 μm. FIG. 19 is an ESEM photograph of a cross-section of the cantilever.

The laser beam of the laser displacement meter was focused on the tip of the cantilever which was screwed to an optical table. Upon application of the electric field across the thickness direction of the Sb—NKNLN layer, the cantilever deformed due to the constraint of the copper non-piezoelectric layer resulting in a vertical displacement of the cantilever tip, which was monitored by the displacement meter. The $-d_{31}$ value of the Sb—NKNLN film was then determined using the following equation:

$$d_{31} = \frac{h_{can} t_2}{3VL^2} \cdot \frac{E_1^2 t_1^4 + E_2^2 t_2^4 + 2E_1 t_1 E_2 t_2 (2t_1^2 + 2t_2^2 + 3t_1 t_2)}{E_1 E_2 t_1 (t_1 + t_2)(1 - v)} \quad (1)$$

where $h_{can}$ is the cantilever tip displacement, V is the applied DC voltage, L is the length of the cantilever, $v \approx 0.3$ the Poisson's ratio, $t_1$ and $t_2$ the thicknesses of Cu and Sb—NKNLN, $E_1=130$ GPa and $E_2=82$ GPa the Young's modulus of Cu and Sb—NKNLN, respectively.

Figure 20:
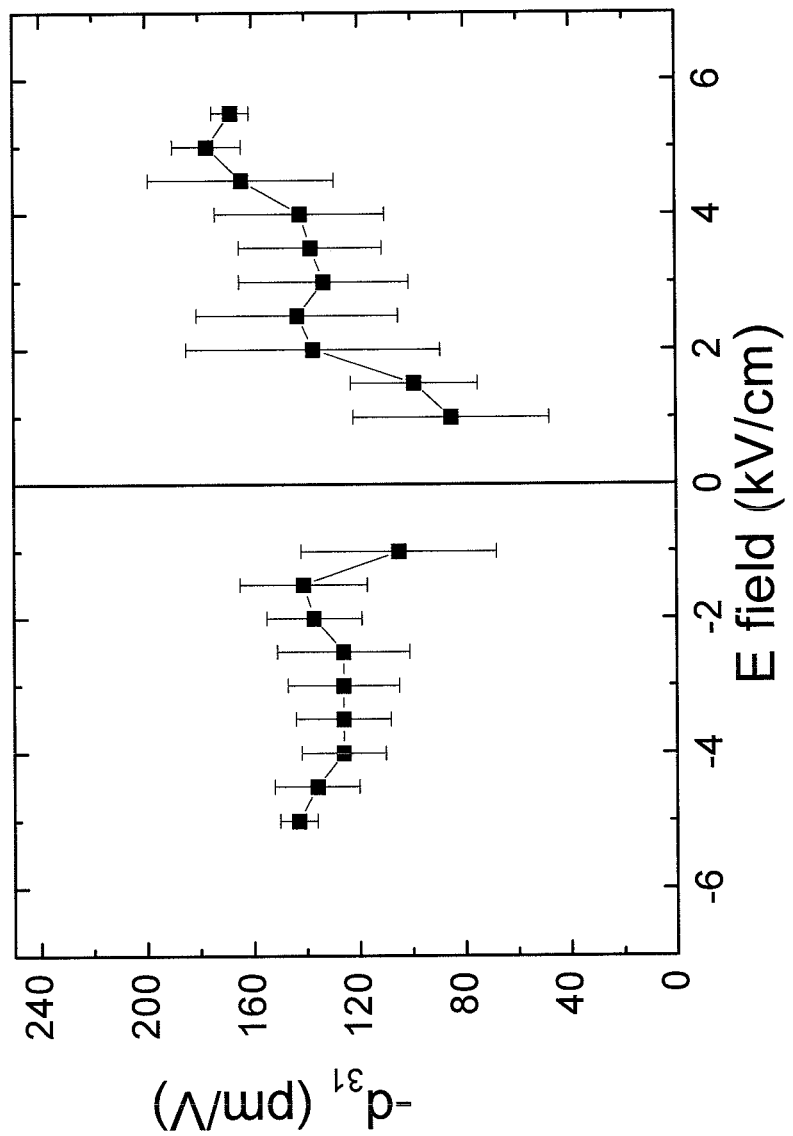
FIG. 20 is a graph of the dielectric constant $-d_{31}$ of an Sb—NKNLN film deduced from cantilever bending measurement as a function the applied electric field.

As shown in FIG. 20, the $-d_{31}$ value obtained using the cantilever bending measurement was much smaller than that of the direct measurement from the Sb—NKNLN strip. This was likely due to the presence of the Cu layer. In the direct measurement, the thickness of the Pt electrodes coated on both sides of the Sb—NKNLN film was of a magnitude of only nanometers. Because the electroplated Cu layer used in the bending measurement has a similar thickness in comparison to that of the Sb—NKNLN layer, it could have compromised the "free-standing" condition of the Sb—NKNLN film and consequently produced a smaller enhancement of the piezoelectric coefficient. Nevertheless, the $-d_{31}$ value of Sb—NKNLN still showed about a 2-fold increase at a field of about 5 kV/cm.

Having described the preferred embodiments of the invention which are intended to be illustrative and not limiting, it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, the intended scope of protection is set forth in the appended claims.

The invention claimed is:

1. A method of atomic force microscopy comprising the steps of:
    a) actuating a microcantilever force sensor located in contact with or proximate to an object, wherein the microcantilever force sensor comprises a piezoelectric layer and a non-piezoelectric layer, wherein said piezoelectric layer is selected from the group consisting of:
        a piezoelectric film having a dielectric constant of more than about 1600 and a thickness of less than about 8 µm, and
        a piezoelectric film having a thickness less than about 75µm and a piezoelectric coefficient $-d_{31}$ of more than about 250 pm/V;
    b) detecting a shift in resonance frequency using the microcantilever force sensor; and
    c) determining a characteristic of the object from said detected resonance frequency shift.

2. The method of claim 1, wherein the characteristic of step (c) is selected from the group consisting of: a Young's modulus, a shear modulus, lateral stiffness, an in-depth stiffness, a local height of the object and a topographical characteristic of the object.

3. The method of claim 1, wherein step (c) comprises generating an image of the object.

4. The method of claim 1, wherein the microcantilever force sensor further comprises a first electrode located between the piezoelectric layer and the non-piezoelectric layer and a second electrode located on a second side of said piezoelectric layer, and wherein step (a) comprises applying a voltage to the first electrode and wherein step (b) comprises detecting an induced piezoelectric voltage within the second electrode.

5. The method of claim 1, wherein step (a) comprises driving the microcantilever force sensor in a capacitive method by applying a voltage across the piezoelectric layer.

6. The method of claim 1, wherein the microcantilever force sensor comprises two piezoelectric layers and wherein the non-piezoelectric layer is positioned between the two piezoelectric layers.

7. The method of claim 6, wherein step (a) comprises applying a voltage to one of the two piezoelectric layers and wherein step (b) comprises detecting an induced piezoelectric voltage within a second piezoelectric layer.

8. The method of claim 1, further comprising the step of determining a displacement of a tip of the microcantilever force sensor.

9. The method of claim 1, wherein the microcantilever force sensor is operated in a static contact mode.

10. The method of claim 9, wherein a DC induced voltage is used to actuate the microcantilever force sensor in step (a).

11. The method of claim 1, wherein the microcantilever force sensor is operated in a dynamic non-contact mode.

12. The method of claim 11, wherein an AC induced voltage is used to actuate the microcantilever force sensor in step (a).

13. The method of claim 1, wherein a tip of the cantilever is tapped against the object while the microcantilever force sensor is actuated.

14. The method of claim 13, further comprising measuring the position of the cantilever tip and wherein step (c) comprises determining a local height of the object from the position of the cantilever tip.

15. The method of claim 14, wherein the microcantilever force sensor further comprises a sensing element selected from the group consisting of piezoelectric sensing element, piezo-resistive sensing element and magnetic sensing element, and wherein an output of the sensing element is used to determine the position of the cantilever tip.

16. The method of claim 13, wherein said actuating step comprises applying a voltage to induce a resonance frequency at or near a resonance frequency of the cantilever.

17. The method of claim 1, wherein the microcantilever force sensor is operated in a static contact mode and a dynamic non-contact mode.

18. The method of claim 1, wherein the microcantilever force sensor is operated in a DC mode, wherein a DC induced voltage is used to actuate the microcantilever force sensor in step (a) and wherein the microcantilever force sensor is operated in an AC mode, wherein an AC induced voltage is used to actuate the microcantilever force sensor in step (a).

19. A method of atomic force microscopy comprising the steps of:
    a) actuating a microcantilever force sensor, wherein the microcantilever force sensor comprises a piezoelectric layer and a non-piezoelectric layer, wherein said piezoelectric layer is selected from the group consisting of:

a piezoelectric film having a dielectric constant of more than about 1600 and a thickness of less than about 8 µm, and a piezoelectric film having a thickness less than about 75 µm and a piezoelectric coefficient $-d_{31}$ of more than about 250 pm/V, and wherein a tip of the cantilever is tapped against the object while the microcantilever force sensor is actuated;

b) measuring a position of the cantilever tip; and c) determining a local height of the object from the position of the cantilever tip.

20. The method of claim 19, wherein the position of the cantilever tip is measured by directing a beam of light to a photodetector after reflecting the beam of light from a portion of the cantilever force sensor.

* * * * *